Feb. 22, 1944.                J. D. ELDER                2,342,621
            MACHINE AND METHOD OF MANUFACTURING SPOT CAPS
              Original Filed March 5, 1934    13 Sheets-Sheet 1

Inventor
John D. Elder

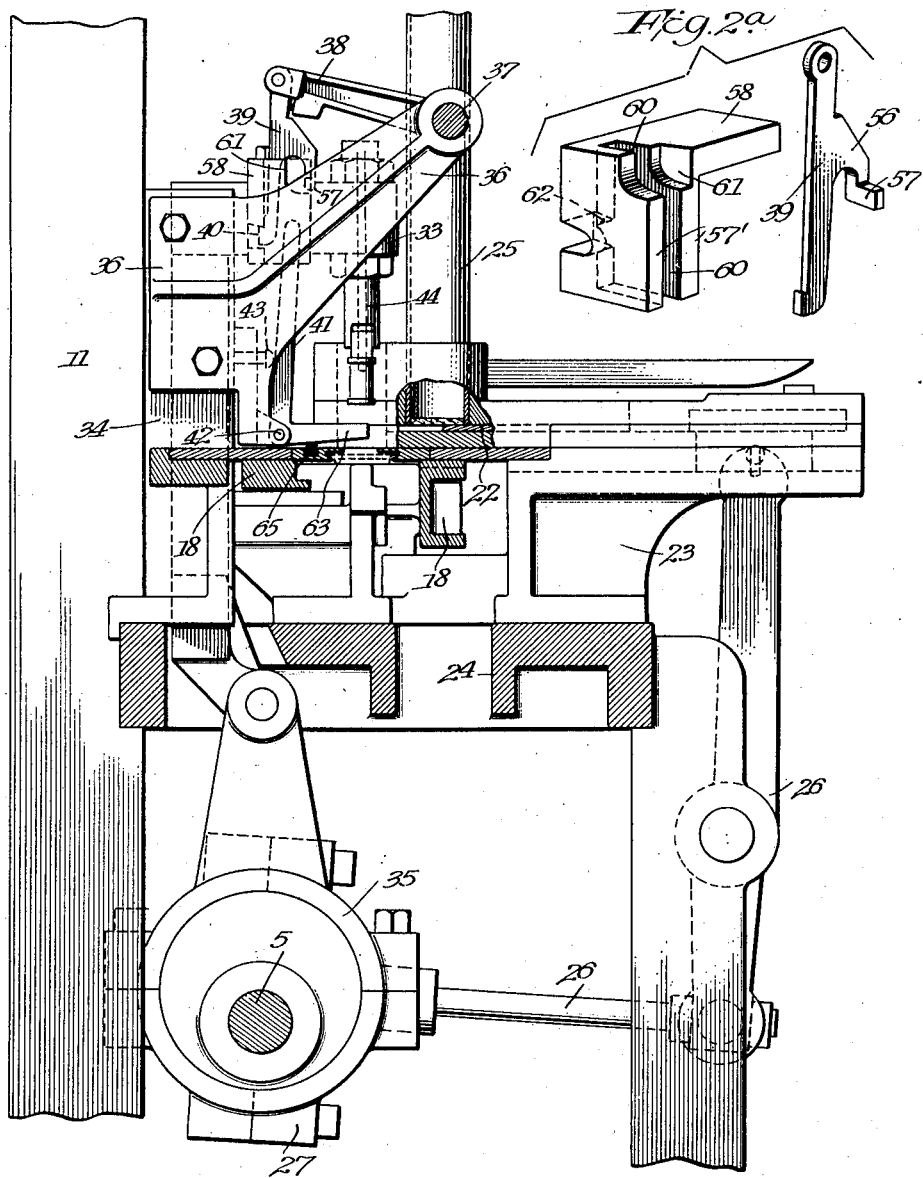

Feb. 22, 1944.   J. D. ELDER   2,342,621
MACHINE AND METHOD OF MANUFACTURING SPOT CAPS
Original Filed March 5, 1934   13 Sheets—Sheet 3
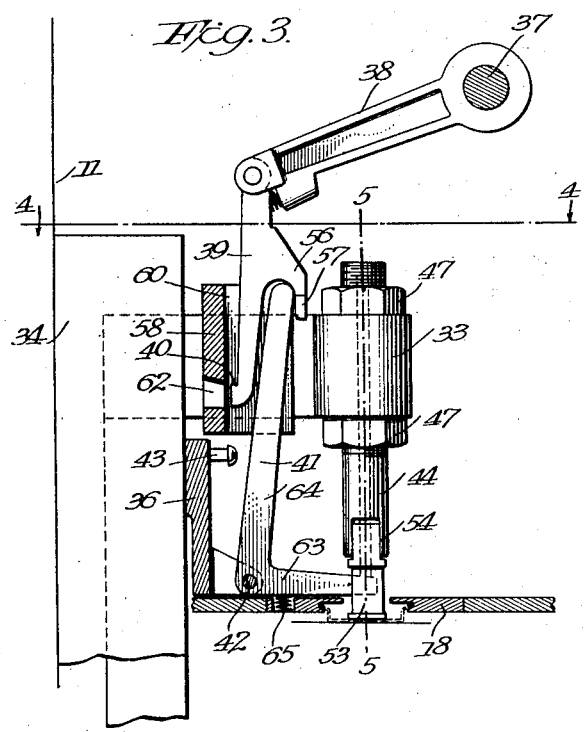
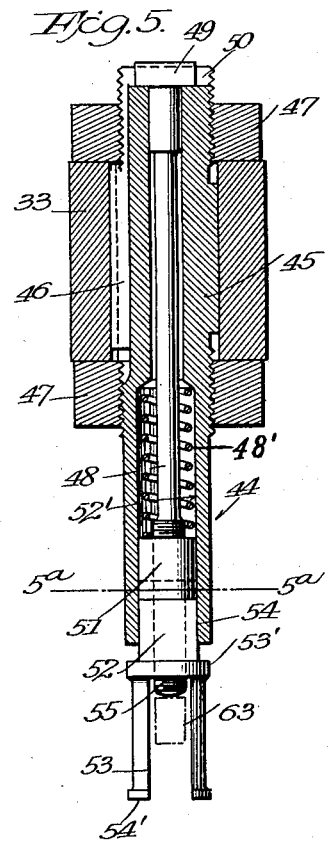
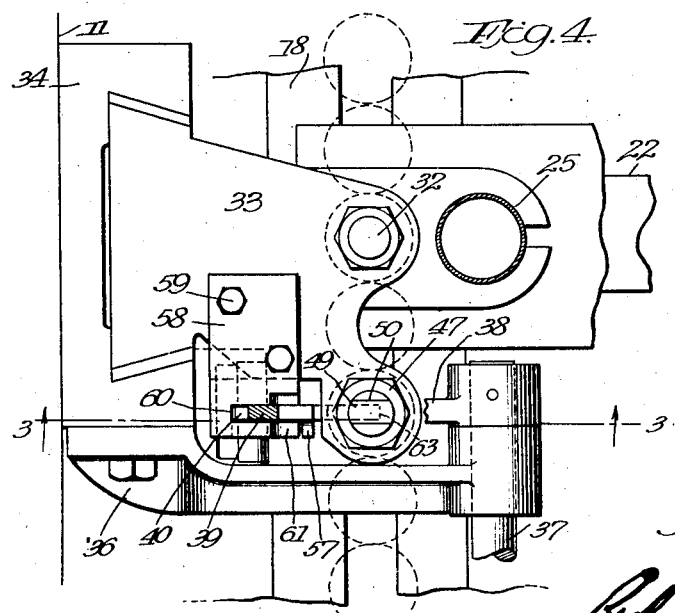
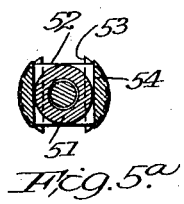
Inventor
John D. Elder.

Feb. 22, 1944. J. D. ELDER 2,342,621
MACHINE AND METHOD OF MANUFACTURING SPOT CAPS
Original Filed March 5, 1934 13 Sheets-Sheet 4
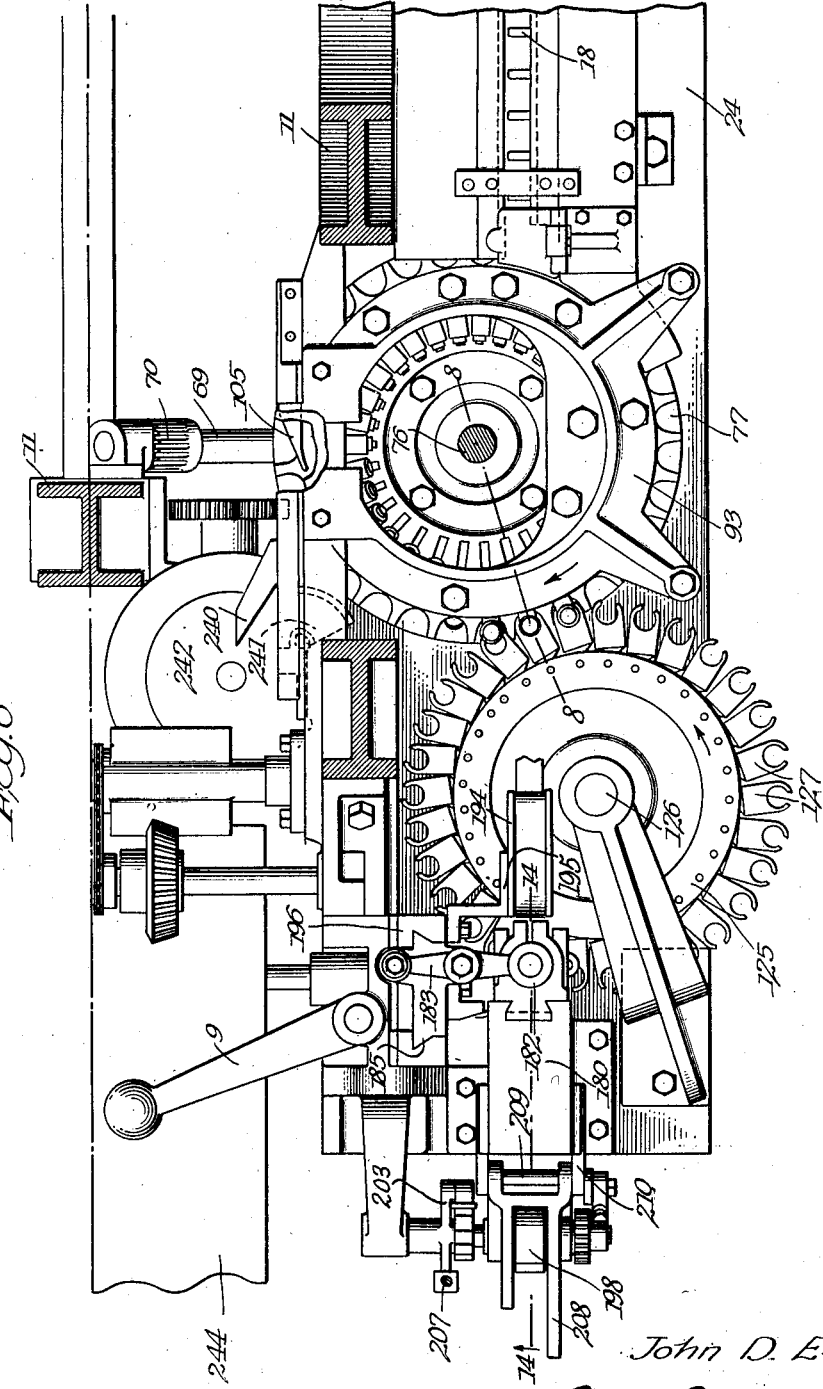

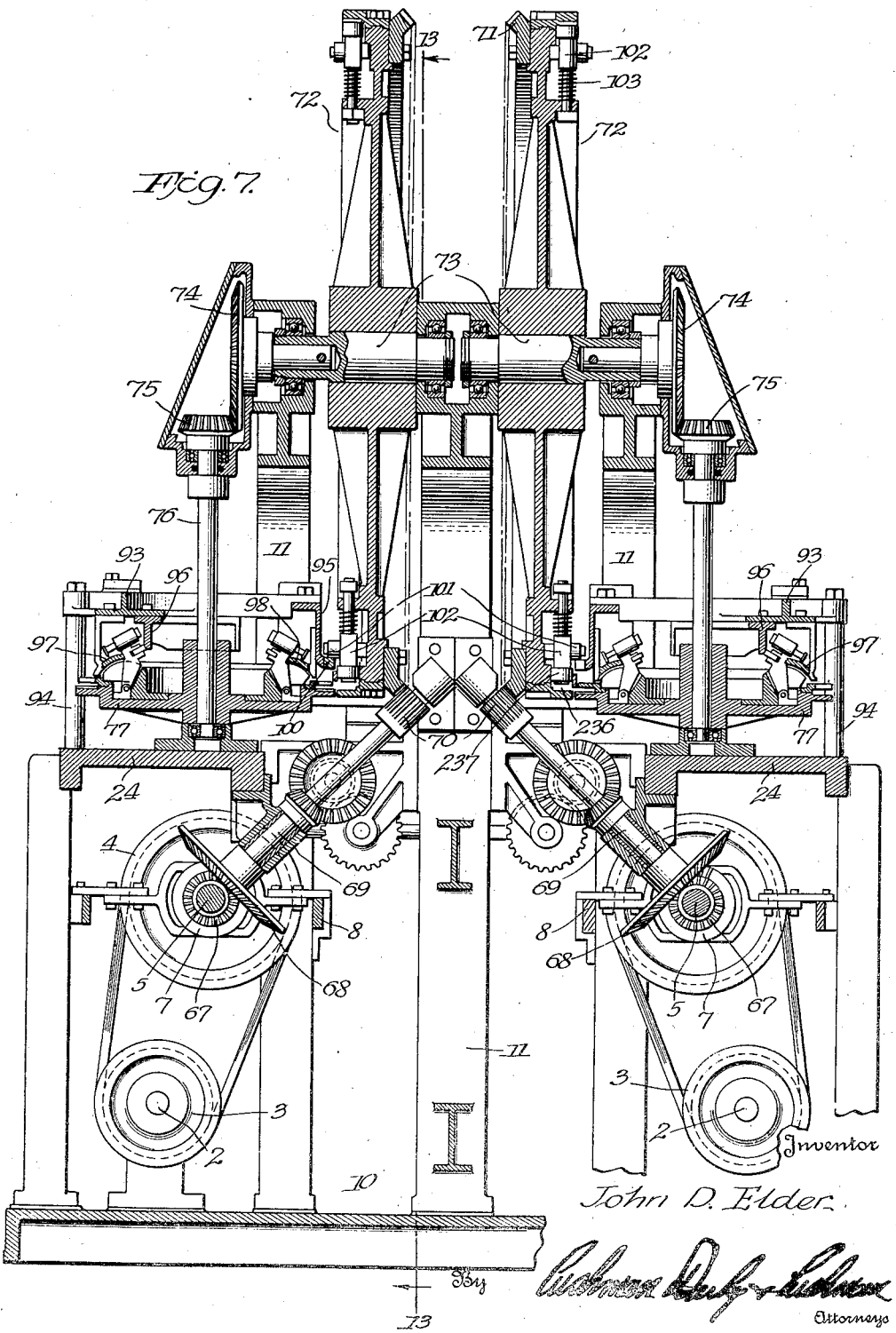

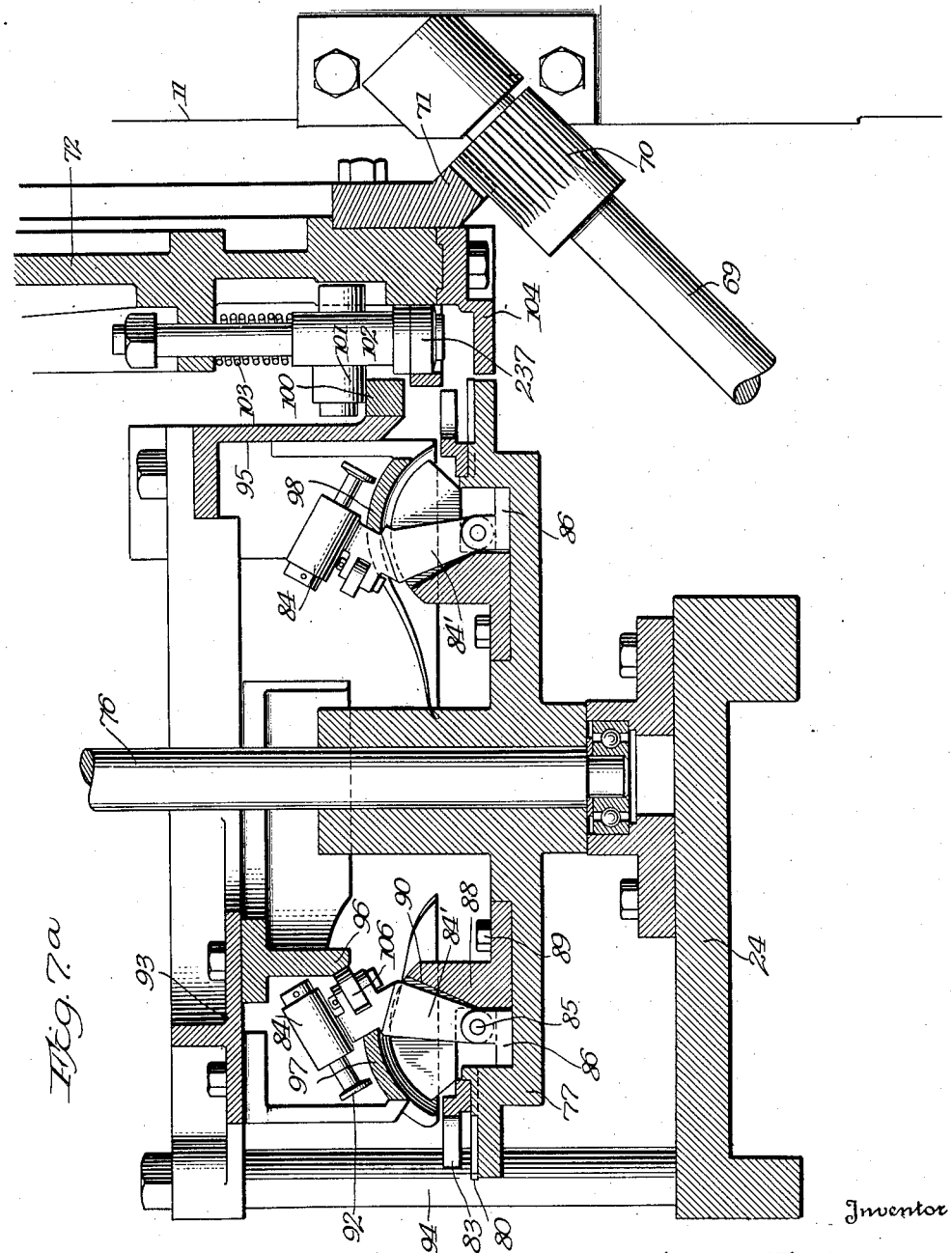

Feb. 22, 1944.　　　J. D. ELDER　　　2,342,621
MACHINE AND METHOD OF MANUFACTURING SPOT CAPS
Original Filed March 5, 1934　　13 Sheets-Sheet 7
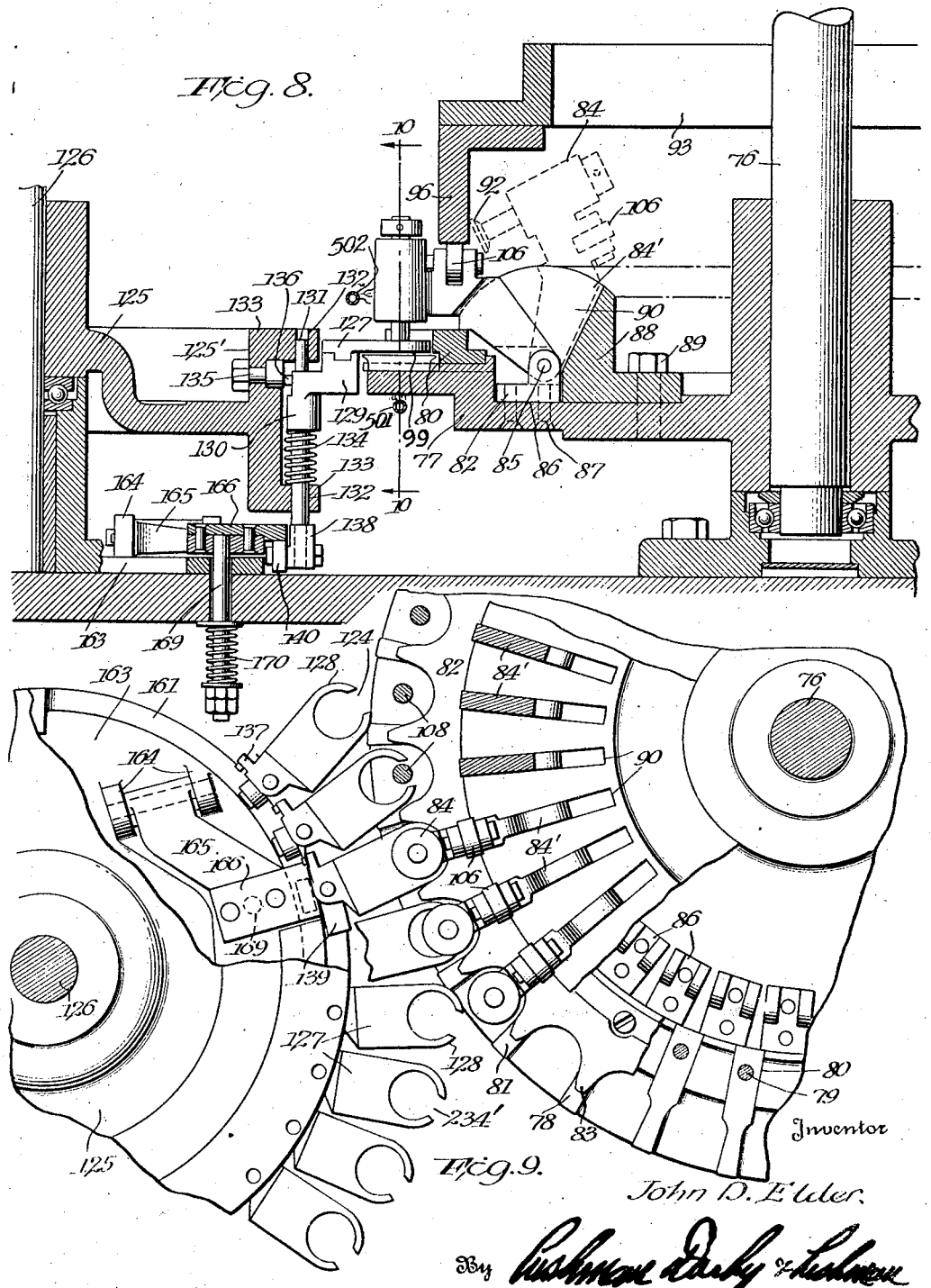

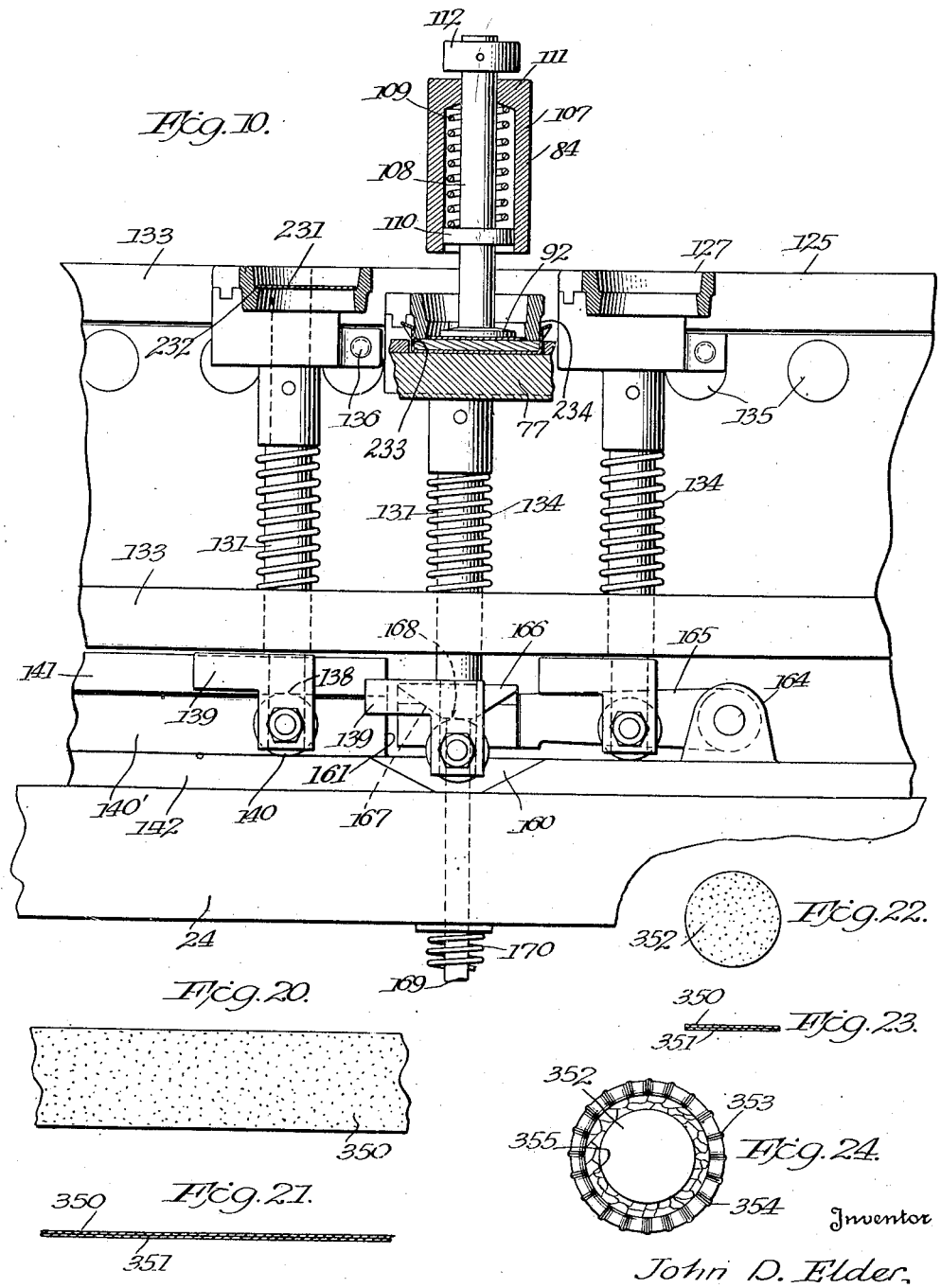

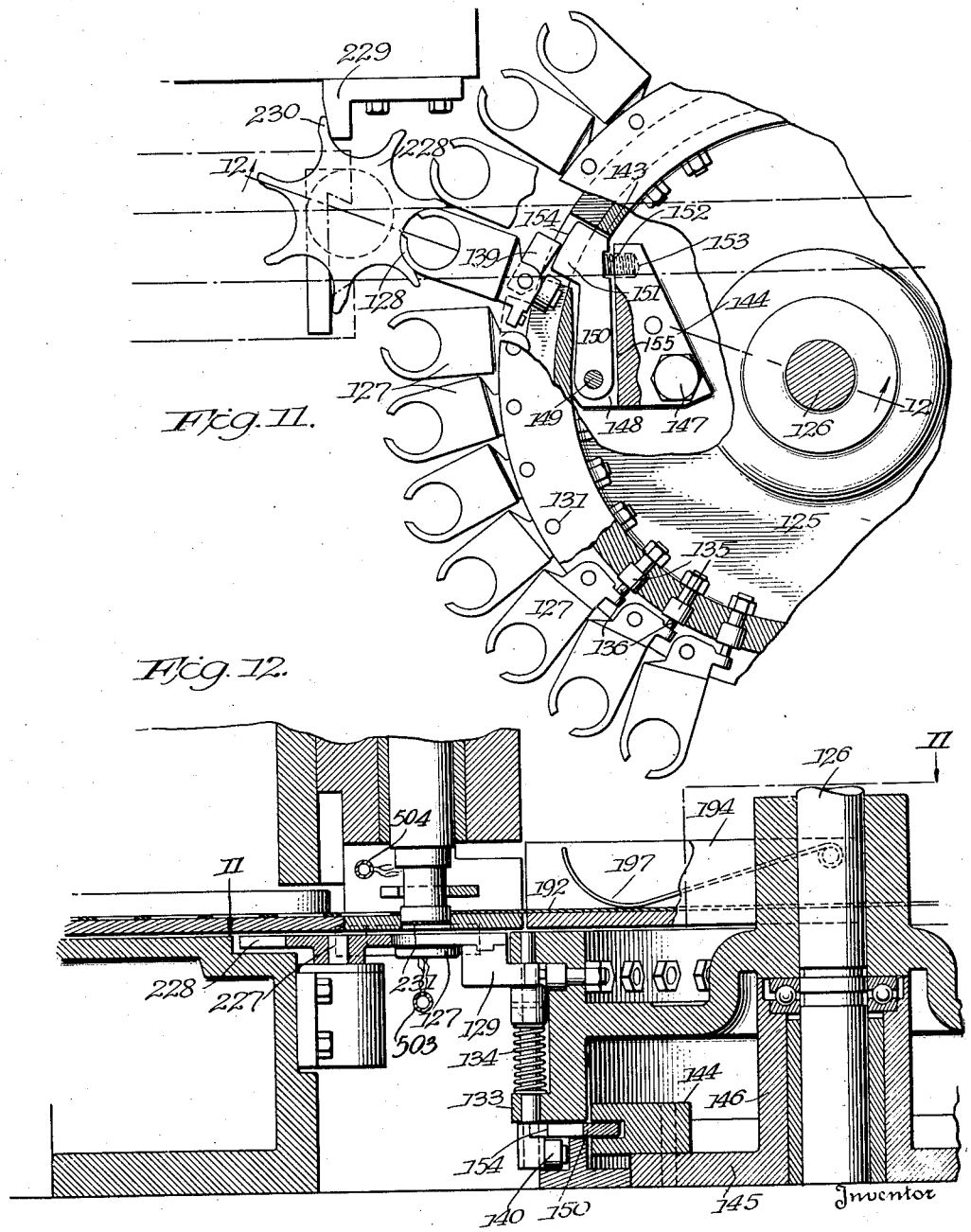

Feb. 22, 1944. J. D. ELDER 2,342,621
MACHINE AND METHOD OF MANUFACTURING SPOT CAPS
Original Filed March 5, 1934 13 Sheets-Sheet 10

Inventor
John D. Elder.
By [signature]
Attorneys

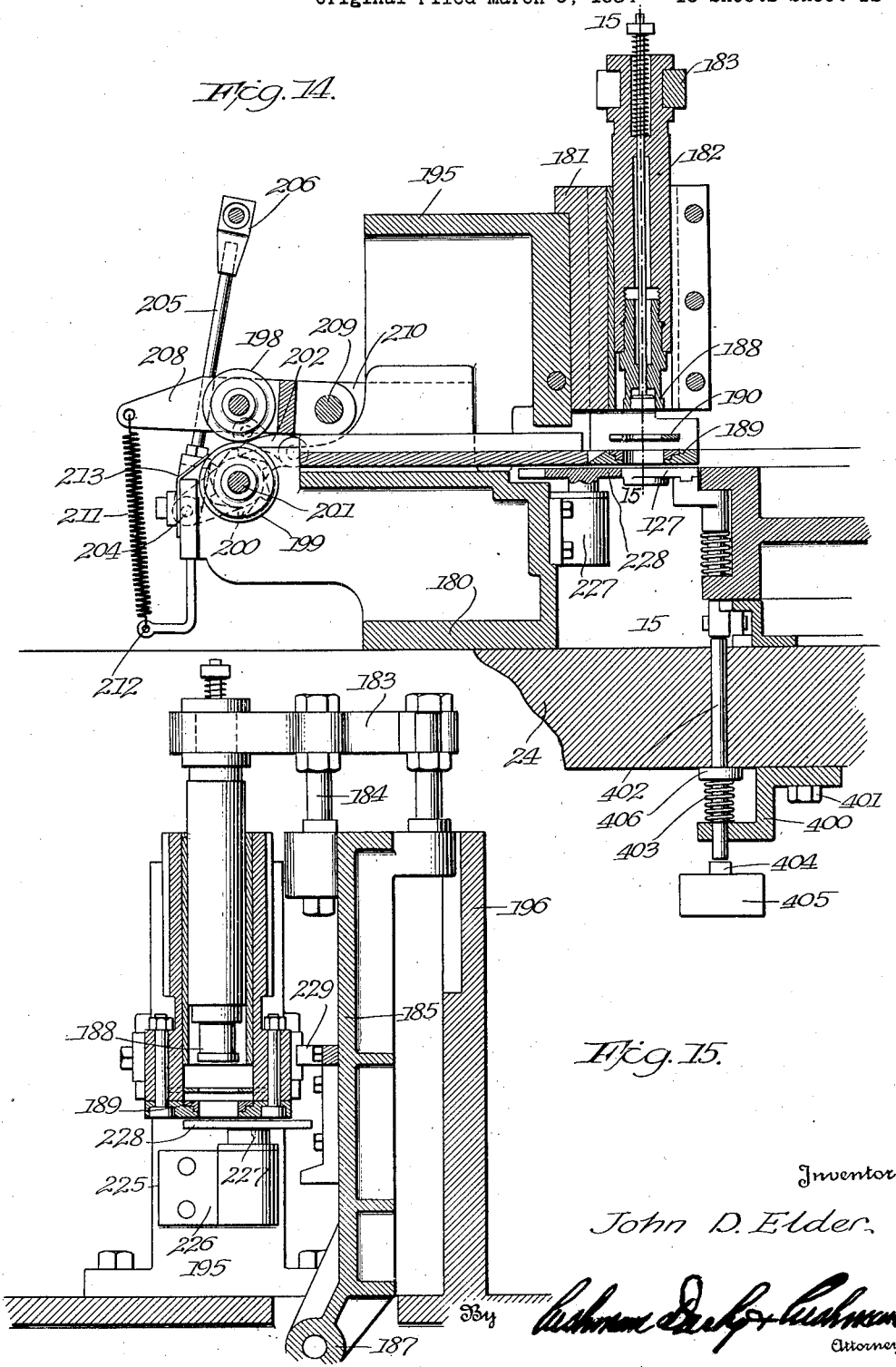

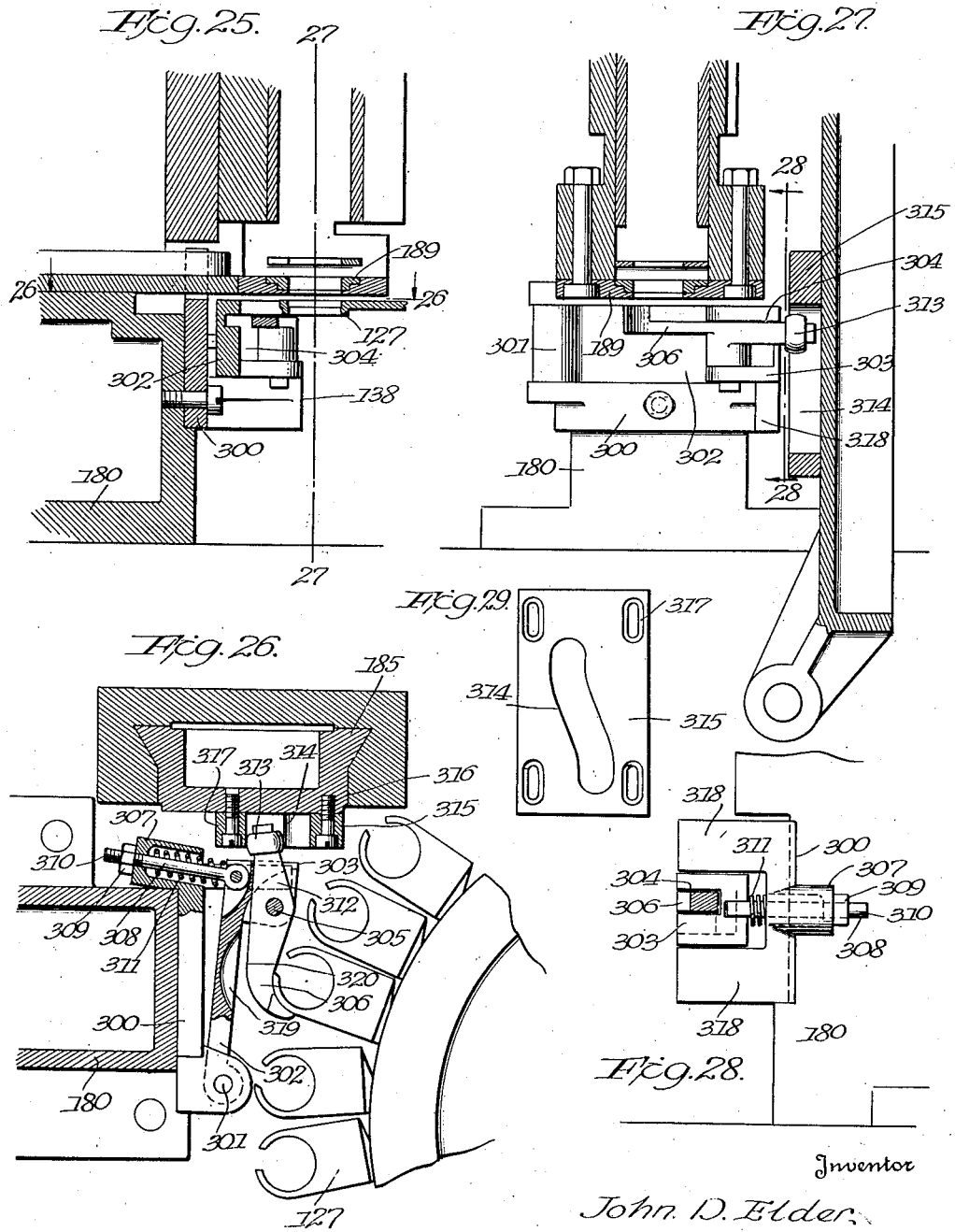

Patented Feb. 22, 1944

2,342,621

UNITED STATES PATENT OFFICE 2,342,621

MACHINE AND METHOD OF MANUFACTURING SPOT CAPS

John D. Elder, Baltimore, Md., assignor to Crown Cork & Seal Company, Inc., Baltimore, Md., a corporation of New York Application March 5, 1934, Serial No. 714,167
Renewed August 24, 1939

77 Claims. (Cl. 113—80)

This invention relates to an apparatus for manufacturing container caps.

Particularly the invention includes a continuous method of producing completely assembled caps of the spotted type which comprise a metal shell, a cushion liner, and a spot facing.

The apparatus of the present invention affords this continuous assembly operation and assures not only a better assembled cap, but increases the production of caps materially.

Heretofore it has been customary to make crown caps according to two methods: (1) the manufacture of the shell with a cork disc therein and subsequently in a separate mechanism to subject the preformed article to the various steps involved in center spotting; (2) the several operations are performed more or less continuously in the same mechanism, i. e., the cork disc and the shell are assembled in the same mechanism in which the spotting operations are performed. In one aspect, the present invention relates to a method and apparatus of the second type.

An object of this invention is to dispense with the intermittent and usual straight line movement of the shells having the cork discs and to feed the same by a continuous movement during which the spots are applied and firmly adhered.

Another object of the invention is to quickly convert the movement of the intermittently formed spots into a continuous movement, in the course of which they are applied to the cork discs while the latter are continuously moving.

Conventional machinery for center spotting caps is illustrated for example in the patent to Johnson 1,852,578, April 5, 1932, such machinery comprising an intermittent feed for the cork discs ordinarily used in crowns and a series of stations for successively (a) heating the cork disc, (b) punching and depositing the center spots, and (c) applying, as by means of a heated plunger, heat and pressure to the previously applied center spot. Subsequently, the spotted caps are permitted to cool under a pressure applied, for example, by means of a series of plungers in a rotating dial.

It is understood, of course, that with a spot cap, it is necessary that the cushion liner be adhesively united to the shell and that the spot facing be likewise adhered to the exposed surface of the cushion, whence it is adapted to contact with the contents of the container.

Since there are a wide variety of adhesives available for the adhering of the cushion and spot, it is an object of the present invention to provide a machine which is universally applicable, regardless of the particular type of adhesive employed.

The apparatus embodies a number of features which will be completely brought out in the succeeding specification and all of which contribute to a rapid production of the caps and efficient adhering of the cushion and spot, and the proper centering of the spot with relation to the cushion, particularly where the usual spot of less diameter than that of the cushion is affixed thereto.

Particularly, however, the invention embodies a control feature whereby strip spotting material will be economically expended and wherein cap shells, which for any reason have not been provided with a cushion, will not be distorted or wasted, but will be recoverable, so that they may be returned to the machine.

Also, the timing construction whereby the cap assembly is completed, is so constructed that there is no likelihood of the various instrumentalities getting out of alignment. The feeding of the metal shells and the application of the cushion and the spot are controlled and the manufacture of the caps automatically accomplished until the final article is completed and discharged from the machine.

Referring to the drawings,

Figure 2 is a vertical transverse cross-section on the line 2—2 of Figure 1, illustrating the cushion applying and tell-tale mechanism.

Figure 2a is a perspective view of the latch and latch block.

Figure 3 is a cross-section on the line 3—3 of Figure 4.

Figure 4 is a cross-section on the line 4—4 of Figure 3.

Figure 5 is a cross-section on the line 5—5 of Figure 3.

Figure 5a is a cross-section on the line 5a—5a of Figure 5.

Figure 6 is a top plan view of the left-hand end of the machine shown in Figure 1.

Figure 7 is a vertical transverse cross-section on the line 7—7 of Figure 1, illustrating how two machines may be mounted on a common base and frame to form a single unit.

Figure 7a is an enlarged cross-sectional view of a cap carrying and pressure dial mechanism.

Figure 8 is a cross-section on the line 8—8 of Figure 6, illustrating the point of transfer of spot to the cap.

Figure 9 is a top plan view of Figure 8, with portions broken away to more clearly illustrate the invention.

Figure 10 is an enlarged cross-section on the line 10—10 of Figure 8, looking in the direction of the arrows.

Figure 11 is a cross-section on the line 11—11 of Figure 12.

Figure 12 is a cross-section on the line 12—12 of Figure 11, illustrating the spot carrying finger mechanism.

Figure 14 is a cross-section on the line 14—14 of Figure 6, illustrating the strip feed and spot punch mechanism.

Figure 15 is a vertical cross-section on the line 15—15 of Figure 14.

Figure 20 is a bottom plan view of a portion of strip material.

Figure 21 is a sectional view showing the composite structure of the strip.

Figure 22 is an elevation of a spot or facing.

Figure 23 is a sectional view of the spot shown in Figure 22.

Figure 24 is a top view of the cap having a spot applied to the cushion thereof.

Figure 25 is a modified form of the spot carrier finger stop mechanism.

Figure 26 is a cross-section on the line 26—26 of Figure 25.

Figure 27 is a cross-section on the line 27—27 of Figure 25.

Figure 28 is a cross-section on the line 28—28 of Figure 26.

Figure 29 is a detail view of a spot carrier stop finger operating cam.

Figure 1:
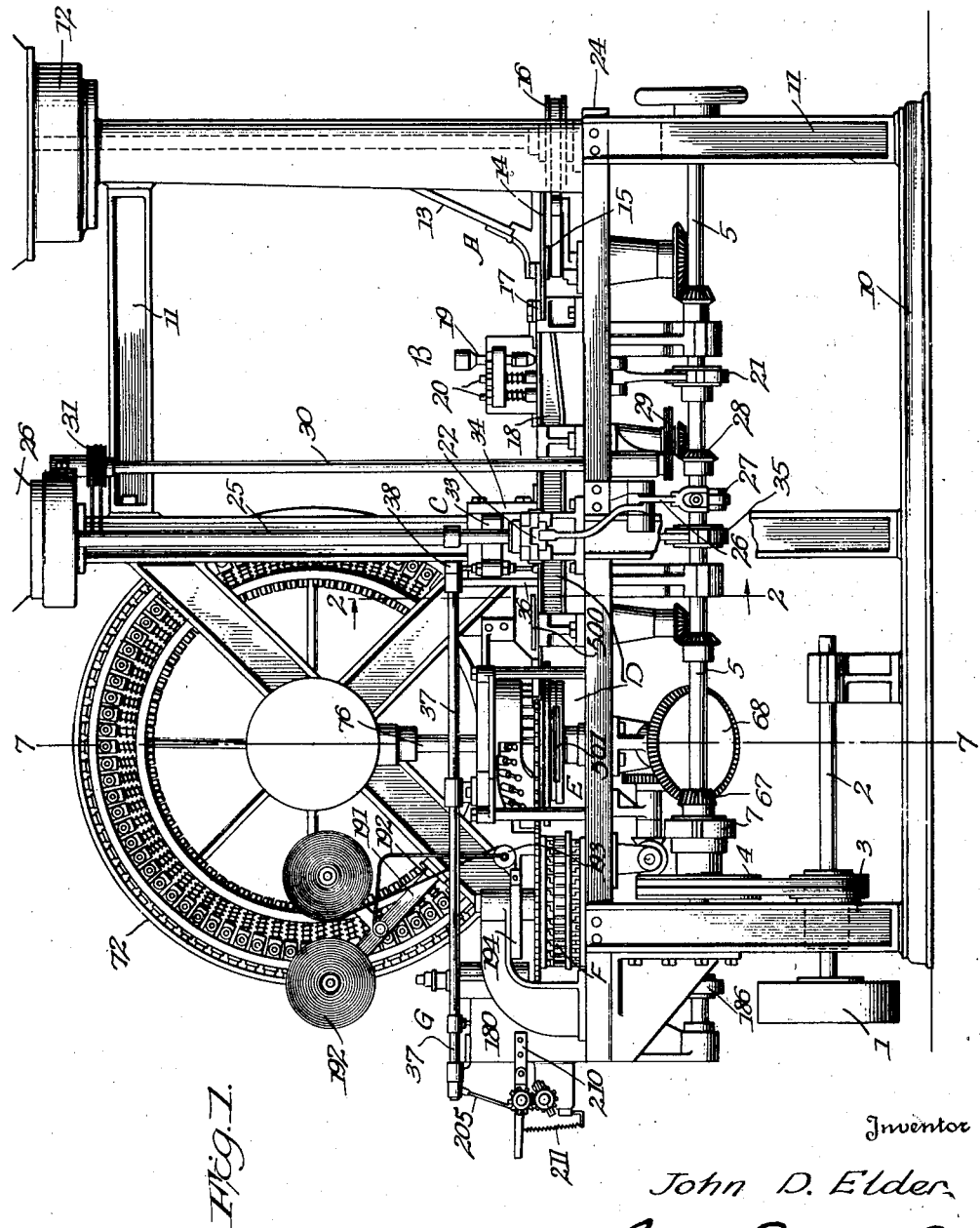
Figure 1 is a side elevation of the machine.

Referring to the drawings, I have indicated in Figure 1, the assembled machine. It is to be observed that the various parts by which the continuous operation of assembling a spot cap is performed are arranged substantially in alignment, so that a relatively narrow space is occupied by the apparatus. In fact, two or more of the complete machines are arranged upon a single base and insure a large saving in floor space.

The machine provides for the continuous assembly of caps which include a metal shell, for example a crown shell, a cushion liner of natural cork or cork composition, and a spot preferably formed from a strip of foil or paper spotting material.

Figure 13:
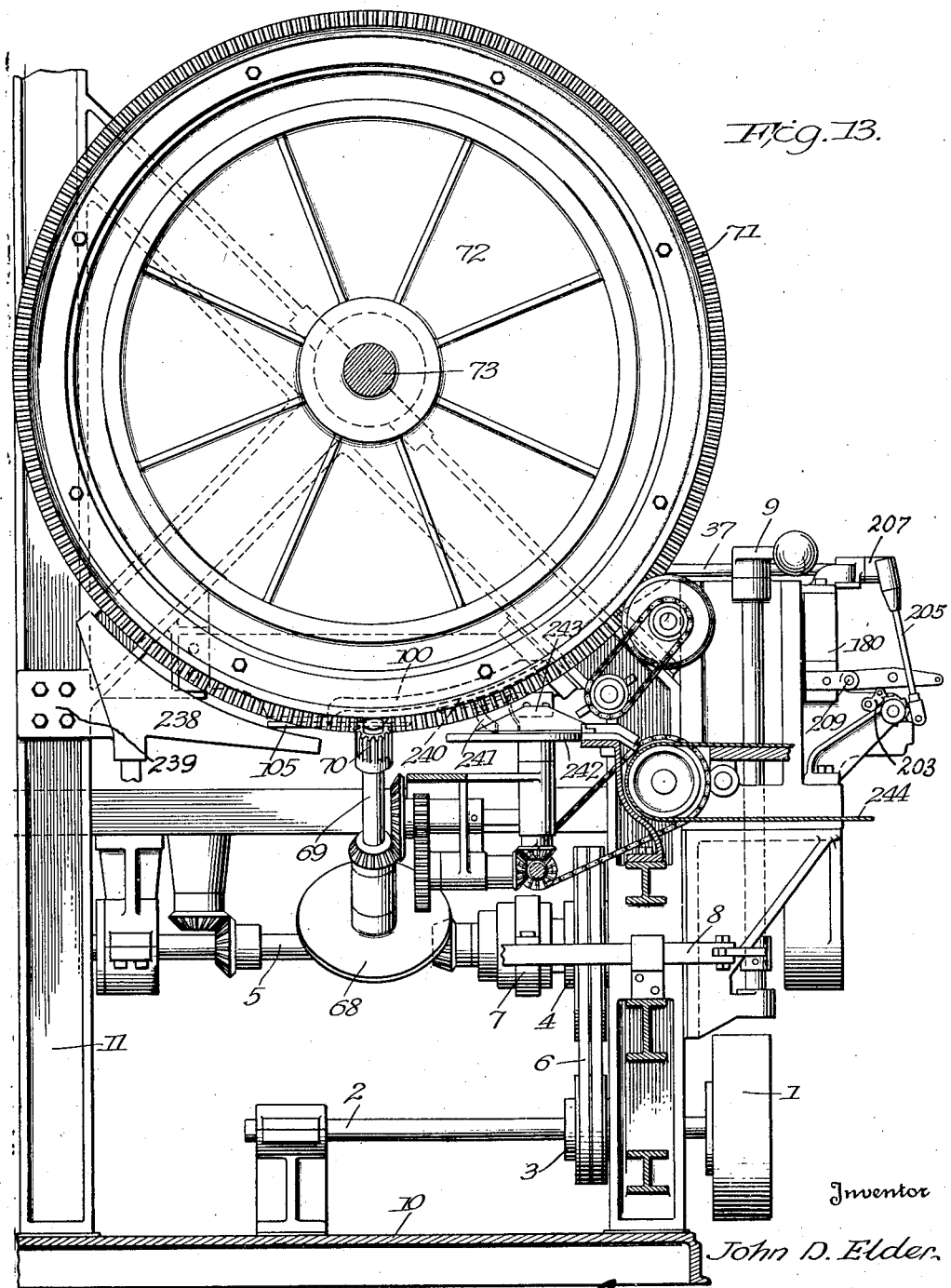
Figure 13 is a vertical cross-section on the line 13—13 of Figure 7, looking in the direction of the arrows.

Referring to Figure 13, the source of power is applied to the pulley 1 which is carried on a shaft 2. A pulley 3 fixed on the shaft 2 and a pulley 4 fixed on the main drive shaft 5 are connected by means of a suitable belt 6, whence power is transmitted to the shaft 5. Associated with the shaft 5 is a clutch mechanism indicated as a whole at 7 controlled by a clutch shaft bar 8 connected to a suitable operating handle 9 for connecting or disconnecting the shaft 5 for rotation.

The numeral 10 indicates the base upon which a pair of machines are mounted and suitable uprights and cross-frames 11 are provided on the base to which various parts of the apparatus are fixed.

Cap shell feed (A)

At A, Figure 1, I have indicated a conventional type of cap feeding means which includes the hopper 12 for the metal shells and a chute 13, which directs the shells onto a shell transfer plate 14 with their open sides presented upward. A suitable pulley 15 is connected by a belt with a similar pulley 16, which, in turn, drives the shaft for operating the conventional distributing mechanism in the hopper 12 to assure that the shells will be fed with their open faces presented upward. The transfer plate 14 is rotated from the main shaft 5 by usual gearing. Associated with the shell transfer plate 14 is a finger means 17 adapted to continuously transfer the shells from the plate 14 to a horizontally disposed step by step conveyor mechanism 18 illustrated in Figures 1, 2, 3 and 6. The conveyor mechanism is of conventional form and is of the type illustrated in the patent to Goebel No. 1,469,557, October 2, 1923. The shells are transferred step by step by this conveyor with their open sides outward to the various assembly instrumentalities.

Adhesive application to shell (B)

At B, I have illustrated an adhesive applying and distributing means comprising a reservoir 19 and a pair of spreader members 20, as shown in Figure 1. This adhesive applying and spreading assembly is reciprocated by means of the eccentric 21 on the shaft 5, and a predetermined quantity of liquid is dropped into each shell from the reservoir 19 as the shells proceeding in their step by step movement temporarily stop under the reservoir. In like manner, the two distributing members 20 spread the adhesive over the inner face of the bottom of the cap.

Cushion disc feeding and positioning (C)

At C, I have illustrated a means for positioning a cushion liner, usually of cork, in the shell. Referring to Figure 2, the conveyor mechanism 18 moves the shell past a reciprocating slide mechanism 22 positioned upon a bracket 23 mounted upon the table 24 carried by the base 10. This slide mechanism is associated with a cushion feeding tube 25 having a hopper 26 at its upper end. The cushions are fed by gravity from the tube to the path of the slide 22, which latter is reciprocated by means of a lever system 26' connected to an eccentric 27 mounted on the drive shaft 5, as shown in Figure 1. The hopper operating mechanism as shown in Figure 1 comprises gearing 28 associated with shaft 5 and a sprocket means 29, whereby the shaft 30 and pulley mechanism 31 at the upper end thereof will actuate suitable means within the hopper to insure the proper feeding of the cushions to the stack 25.

Associated with the cushion feeding means is a cushion positioning means comprising a plunger 32, as shown in Figure 4, which is carried by a cross-head 33 adapted to be reciprocated in a dove-tailed slide 34 fixed on the adjacent frame member 11. The cross-head is reciprocated by means of an eccentric 35 connected to the drive shaft 5, as shown in Figures 1 and 4. The conveyor 18 carries each shell into a position beneath the plunger 32 and the slide 22 positions a cushion disc in alignment with the plunger and the shell, so that at each stationary position of the shell beneath the plunger, the downward movement of the plunger presses a disc into the open side of the shell and positions the same therein upon the adhesive applied at B.

Any suitable disc feeding means and plunger positioning means may be employed to produce an assembly of the shell and cushion disc, such means preferably automatic and timed for cooperation with the step by step conveyor 18.

*Tell-tale device—Feed control for strip stopping material (D)*

Fixed to the cross-head guide 34, as shown in Figure 4, is a laterally extending bracket 36 supporting one end of a longitudinally extending shaft 37, which is adapted to be reciprocated and to operate the strip feeding means indicated at the left of Figure 1, as a whole, by the letter G. This shaft has fixed to it a strip feed latch arm 38, as shown in Figures 2 and 3, and pivotally connected to this arm is a downwardly extending latch 39 having a laterally extending detent 40 at its lower end. This bracket 36 also carries a strip feed latch operating lever 41 pivoted at 42 to the bracket 36 and a stop pin or screw 43 against which the lever normally rests, is fixed to the bracket, all as shown in Figures 2 and 3.

Referring to Figures 2, 3 and 4, the reciprocating cross-head 33 carries a tell-tale device 44 illustrated in detail in Figure 5 and Figure 5a. The purpose of this device is to engage a cushion of the semi-complete cap to actuate the strip feeding means and in cases where no cushion has been fed to the shell or a shell has not been fed in proper sequence to the conveyor, to register this discrepancy and prevent feed of the strip spotting material. In other words, if for any reason a cushion is not assembled in the shell or a gap is presented in the shells fed by the conveyor, the feed of the spotting material will be temporarily discontinued until a properly assembled cushion and shell on the step by step conveyor 18 have been presented to the tell-tale mechanism.

The reciprocating tell-tale device derives its movement from association with the reciprocating cross-head 33 and comprises, referring to Figure 5, an elongated or sleeve-like body portion 45, which is keyed against rotation to the reciprocating cross-head at 46 and held in place against longitudinal movement with respect to the cross-head by nuts 47 above and below the cross-head. This construction permits adjustment of the body and associated parts without rotation thereof. Mounted for sliding movement within the body member 45 is a rod or stem 48 having an enlarged upper end 49 fitting in a transverse slot 50 to prevent rotation of the rod in the body portion. At its lower end, the stem has threaded thereon a cylindrical guide member 51 engaging the cylindrical lower wall 52' of the interior of the body member. The cylinder 51 is provided with a squared integral extension 52 terminating in a slotted projection 53. As shown in Figures 3 and 5a, the lower end of the body portion 45 is squared and slotted, as shown at 54, so as to receive and properly guide the squared portion 52 in the sliding movement of the stem 48. The threaded portion of the stem extends through the cylindrical and squared portions 52, 54 and threaded end 55 of stem 48 projects into the slot 53, as shown in Figure 5.

As stated, the stem 48 and associated parts are slidably mounted within the body portion 45 carried by the cross-head, and in the normal position of the stem with respect to the said body portion and cross-head, the flange 53' is spaced from the lower end of the slotted portion 54 of the elongated body portion 45. This affords a limited movement for the stem with respect to the body portion 45, so that when the bottom 54' of slotted portion 53 engages a cushion positioned in a shell, the stem and associated parts may move upwardly, whereas if no cushion is present in the shell, the stem and associated parts will be suspended from the body portion with the flange 53' spaced from the bottom thereof, as shown in Figure 5.

Referring to Figures 2, 2a, 3 and 4, the latch or long arm 39 is provided with a short arm or finger 56 having an offset portion or lug 57, and referring to Figure 3, and particularly Figure 4, a strip feed latch guide block 58 in the form of an angular member is bolted to the cross-head, as shown at 59. This guide block is provided with a slot as shown at 60, terminating in a recess 61 at its upper end, all as shown in Figures 2a and 4.

The depending portion of the angular member or block 58 is provided with a detent receiving opening 62 adapted to receive the detent 40 of the strip feed latch 39. The long arm of the strip feed latch extends into the slot 60 with the short arm and lug 57 disposed in the recess 61 and the detent 40 engages in the opening 62 of the strip feed guide block. This is the normal position of these parts.

Referring to Figure 2, the reciprocatory movement of the cross-head and the detent 40 engaged in the opening in the block 58 will cause the latch 39 and lever 38 to be reciprocated and in turn reciprocate the shaft 37. Upon each downward movement of the cross-head and consequent return movement of the shaft 37, the strip spotting material feed mechanism shown at G, in Figure 1, is actuated.

It will be understood that the step by step conveyor feeds the assembled shell and cushion to a position below the reciprocating tell-tale device as shown in Figures 2 and 3. If a cushion is properly positioned within the shell, the engagement of the foot 54' with the cushion produces no change in the normal operation of the parts, the said foot engaging each cushion while it is temporarily stopped during its travelling movement on the conveyor 18.

*Operation when shell without cushion is moved past the tell-tale device*

Referring to Figure 3, I have illustrated the detent 40 out of engagement in the opening 62 in the guide block 58, in which position of the parts the latch 39 is disengaged from the guide block 58 connected to the reciprocating crosshead 33, which is in its downward reciprocated position with the presser foot 54' engaging the base of the shell not having a cushion disc therein. Hence, the upward movement of the crosshead and the downward return movement thereof will not actuate the shaft 37 and the feeding of the strip material will be halted until the detent 40 is again engaged in the opening 62.

This disengagement of the parts occurs when for any reason a cushion disc is not fed to the shell, or a gap occurs in the line of shells on the conveyor 14, and as the tell-tale device is reciprocated, the sliding stem 48 and associated parts are not moved upwardly within the elongated body portion 45, as would be the result were a cushion within the shell, but, on the contrary, the stem 48 and associated parts remain suspended from the body portion 45. In such an instance, the end 55 of the stem projecting in the slot 53, as shown in Figure 5, will engage one arm 63 of the strip feed latch operating lever 41, as shown in Figure 3, which lever is normally positioned so as to be in alignment with the slot 53 of the tell-tale device and the end of the stem 55. The weight of the stem 48 which may be increased or decreased or supplemented by a spring 48', for example, and associated parts is such that the engagement of the end of the stem 55 with the arm 63 will rock the lever 41 on its pivot 42 and move the other arm 64 of the bell crank lever away from its normal position in engagement with the stop pin 43, shown in Figure 2, to the position shown in Figure 3. Normally the bell crank lever is held in the position shown in Figure 2 with its arm 64 engaging the pin 43 by reason of the spring 65 mounted in a recess in the cover plate for the conveyor 18.

This rocking of the bell crank lever will cause the arm 64 to be shifted and engage the short arm 56 of the latch member 39, whereby the same is moved, and the lug 57 is moved out of the recess 61 in the upper end of the guide block 58 carried by the reciprocating cross-head, and said lug 57 is positioned laterally outside the adjacent face 57' of the guide, by which it is positively held out of the recess as the block has its upward movement. At the same time, the latch member 39 is likewise moved away from the guide block and the detent 40 is, therefore, disengaged from the opening 62. Hence, in the upward movement of the cross-head 33 the lever mechanism 38, 39 fixed to the shaft 37 being disengaged from the opening 62 is not moved upwardly. As a consequence, when the cross-head subsequently moves downwardly, the shaft 37 is not oscillated to operate the strip spotting material feed mechanism and the feed is, therefore, temporarily halted until the next succeeding shell having a cushion therein is presented to the tell-tale device. This complete cycle is necessary to leave the feed lever, when disengaged, in its downward position.

Assuming that the next shell has a cushion therein, the base 54' of the tell-tale device will engage the cork cushion and the end 55 of the stem will not be brought into contact with the end of the lever 63 of the bell crank 41. At the same time, the lug 57 will move back into the recess 61 and the bell crank 41 will assume its normal position under the action of the spring 65 to move the detent 40 into the opening 62 of the guide block. This return of the detent 40 to the opening 62 is assisted by the spring 66 positioned between the arm 38 and the latch arm 39, acting to project the arm 39 outwardly.

It will be observed then that so long as the shell presented to the tell-tale device has a cushion positioned therein, that the tell-tale device will simply have its stem and associated parts moved relative to the body portion 45. On the other hand, if the shell does not have a cushion present therein, or no shell is presented, the stem and associated parts are not moved relative to the body portion 45, but, on the contrary, the end of the stem 55 assumes a position in engagement with the arm 63 of the bell crank lever 41 and due to the weight of the stem and associated parts, this bell crank lever is rocked to disengage the lug 57 from the recess 61 in the guide block and the detent 40 from the opening 62 in the guide block. When the parts are so disengaged, the lever 37 is prevented from oscillating and the spot material feed is temporarily stopped until the succeeding cap containing a cushion is again presented on the step by step conveyor 18 to the tell-tale device when the normal feeding of the strip material resumes.

It is also to be understood that it is the downward movement of reciprocation of the shaft 37 which operates the spotting material strip feed mechanism and hence so long as the detent 40 is positioned in the opening 62 of the block 58, this downward movement of reciprocation is imparted to the shaft 37.

*Cap transfer dial and spot applying dial (E)*

From the disc positioning and tell-tale means, the cap assembly comprising the shell and cushion positioned therein, is passed to a cap transfer dial indicated as a whole at E, in Figure 1.

Referring to Figure 7, and to Figure 1, the shaft 5 is provided with a pinion 67 engaging a gear 68 on a shaft 69 carrying a pinion 70 which, in turn, engages a ring gear 71 on a pressure dial 72, which will later be more completely referred to. This pressure dial is mounted on a shaft 73 having a gear 74 at one end, which engages a pinion 75 carried by a shaft 76, upon the lower end of which shaft, as shown in Figure 7, is mounted for rotary movement the said cap transfer dial. The dial comprises a plate member 77 about the periphery of which are disposed a multiplicity of equally spaced cap centering fingers 78, which form pockets for receiving the caps from the conveyor 18. These fingers 78 are substantially L-shaped in longitudinal cross-section and the rear ends thereof are disposed in slots 80 formed in the plate, as shown in Figures 8 and 9, so that the forward ends of the fingers extend above the plane of the plate as shown at 81, while the rear ends are substantially flush with the top view of the plate. Each pair of pocket fingers is spaced apart a sufficient distance corresponding substantially to the size of the cap shell below the cap flange thereof to receive the cap and the step by step conveyor moves each cap into a pocket of the rotary dial defined by the fingers with the skirt flange overlying the fingers.

Superposed above the said fingers 78 is a ring gear 82, as shown in Figures 8 and 9, extending about the periphery of the transfer dial and this ring gear is provided with a body portion disposed upon the surface of the dial at the rear ends of the fingers 78 disposed in the slots 80 to overlie the fingers. This ring gear and the fingers are secured to the dial plate by means of the bolts 79. The tooth portions of the ring gear indicated at 83 are offset with respect to the body portion of the ring gear, as shown in Figure 8, and hence are spaced above the fingers 78 a distance slightly greater than the overall depth of the particular cap, so that the cap flange is received between the fingers 78 and the gear teeth 83.

In this manner, the cap shells are held in spaced relation for the application of the spot, but are freely supported, so that after the spotting operation is completed, the caps may be removed from the dial by means of a suitable ejector as will be later described.

Referring to Figures 7a and 8, there is disposed in rear of the ring gear and cap receiving fingers 78 the means for applying a spot to the surface of the cushion or disc in the shell. This means comprises a plurality of circumferentially spaced spot plungers 84 mounted upon carriers 84' which are pivoted at 85 in brackets 86 bolted to the dial plate at 87. Positioned upon the dial plate, in rear of the brackets 86, is a ring-shaped spot plunger carrier guide ring 88 bolted to the dial plate at 89 and having a multiplicity of slots 90 formed therein corresponding to the number of spot plungers 84 and plunger carriers 84' which are employed. The walls of the slots act as guides for the pivotally mounted plunger carriers 84'. The slots are of a sufficient extent to permit the plungers to assume a substantially vertical position in full projected position, when the foot 92 of each plunger will engage the surface area of a spot and compact it upon the cushion, as shown in Figure 8.

Supported by the bed plate 24 and the adjacent frame members 11, shown in Figure 1, is a cam supporting member or plate which overlies the dial indicated best at 93 in Figure 7a. As shown, the cam carrier is supported by standards 94 mounted on the bed plate 24 and also by a frame cross-member 95, later again to be referred to, and supported on the frame members 11. Depending from the plate 93 is a series of cams, one of which the pressure cam 96, is of a length and is so positioned with respect to the rotating dial, so as to be effective at the point of transfer of a spot to the cap to project and hold a plunger 84 in its full vertical spot applying position for the required time to affix the spot to the cushion. Associated with the cam 96 are lift cams 97 and 98, the function of which is to project and retract the plunger carriers in their movement toward and away from the point of application of the spot to the crown in cooperation with the pressure cam 96.

As stated, the dial is given a rotational movement at the required speed and each plunger carrier and plunger approaches the point of application of the spot to the cap where the plunger is moved into vertical spot affixing position and retained therein during subsequent movement of the dial, the said cams controlling the projection and retraction of the cap.

I have indicated the point of spot application at 99 in Figure 8. As the plunger carriers move toward this point, the pressure cam 96 and adjacent lift cam 97 cooperate to move the carrier 84' through the slot 90 and position the plunger in a substantially vertical position, as shown in Figure 8. The pressure cam 96 is particularly important in this movement, in that it positions the carrier and the plunger, so that a pressure sufficient to unite the spot to the cushion layer is exerted by the plunger.

The timing is such that after the plunger has been in contact with the surface of the spot for the required interval, the pressure cam 96 permits the carrier to recede and the lift cam 98 contacts with the plunger carrier to raise the same out of the spot applying position. The movement of the plunger carrier in the slot to position the plunger in its vertical position, as shown in Figure 8, will take place gradually in accordance with the speed of the machine and lift of the cam 97.

Several of the carriers approaching the point of spot application 99 on one side of the plunger which is contacting with the spot are partially projected toward final vertical position, while the plungers on the opposite side of the plunger which is applied to the spot remain in pressure applying contact with the spot for a desired period and gradually projected from the spot applying-position, so as to be completely retracted by the time the dial reaches the point of cap transfer to the pressure dial 72.

It is to be understood that the spot is affixed to the caps carried by the pressure dial at the point 99, which operation will be later more completely described, and that thereafter the caps are passed to a pressure dial 72 in which they are finally completed. In their movement on the transfer dial toward the point of transfer to the pressure dial 72, it is, therefore, important that the lift cam 98 act to lift the plunger carriers and plungers to a position free of any possibility of obstructing the transfer mechanism, whereby the assembled spot caps are passed to the pressure dial 72.

Referring, therefore, to Figure 7a, as the spot cap assemblies are completed on the transfer dial, they move toward the transfer mechanism. This transfer mechanism comprises a cam member 100 fixed to the cross-member 95 on the frame members 11 and in the path of rollers 101 carried by the pressure dial 72. The contact of the rollers with the cam serve to retract the compressor plungers 102 against the action of their springs 103, at which time the complete assembled cap is removed into proper position on the pressure dial plate 104 to be engaged by the compressor plunger when the roller is released from the cam. In this manner, the caps are held in compressed position on the pressure dial. The caps are ejected from the transfer dial to a position on the pressure dial by means of the cam 105, shown in Figure 6, mounted on the fixed cross frame member 95, as shown in Figures 6 and 13.

It will be understood, moreover, that the plungers can, therefore, be permitted to contact with the spot and remain in vertical position to affix the same to the cushion for a substantial distance before it is necessary to retract the plungers and plunger carriers, so that they will not obstruct the transfer mechanism.

Referring to Figures 8 and 10, the plunger 84, as shown, is mounted on the carrier 84' by which it is carried to projected and retracted position, and said carrier has a roller 106 which engages the pressure cam 96 carried by the cam plate 93.

The spot applying plunger mechanism is shown in detail in Figure 10 and comprises a body portion 107 within which is mounted a stem 108. About the stem is disposed a coil spring 109 confined between a stop 110 carried by the stem and the end wall 111 of the body portion of the plunger. The stem is reciprocable in the body portion 107 under the action of the spring and at its lower end has the foot 92 which is adapted to engage the surface of the spot with a pressure sufficient to cause it to be united to the adjacent surface of the cushion disc. The outward movement of the stem under the action of the spring 109 is limited by the provision of a suitable collar 112 carried by the stem externally of the body portion. At this point, it should be stated that the purpose of the pressure cam 96 is to project the plunger carrier, so that the plunger will assume a vertical position when applying the spot and the pressure which is impressed upon the foot 92 is provided by the spring 109. This spring has the required tension to affix the spot to the cushion disc.

*Spot carrier dial (F)*

Referring to Figures 6, 8, 9, 10, 11 and 12, I have illustrated the spot carrying dial which is adapted to receive a spot punched from a strip of spot material and deliver it to the point 99, where it is centered upon the face of the cushion liner, and affixed by means of the spot plungers 84.

This spot transfer dial is best illustrated in Figures 8, 9 and 11, and comprises a dial plate 125 mounted for rotation on a stub shaft 126. The dial 125 at its periphery is provided with a plurality of spot carrying fingers 127 extending laterally from the plate. The dial plate, as will be noted, is rotated by the engagement of the rounded slotted ends 128 of said fingers in the correspondingly formed recesses 83 defined by the teeth in the ring gear 82 fixed on the cap transfer dial. In this manner, the spot transfer dial is rotated by the cap transfer dial and also the spot carrying fingers engaging in the recesses provided by the teeth of the gear permits a centering of the fingers 127 with respect to the cap carried in the cap receiving fingers 78 of the transfer dial and assists in centering the spot on the cushion disc.

Referring to Figure 8, the spot carrying fingers extend horizontally as shown and are fixed on a block 129 having a hub 130. The hub 130 is fixed to a shaft 131 which is mounted in openings 132 formed in annular opposed flanges 133 provided on the ring 125' of the dial 125. A spring 134 is confined between the hub 129 and the lower flange 133 as shown and this spring serves to maintain the fingers at all times projected upwardly. Locating pins 125 are mounted in the ring 125' carrying the flanges 133 and engage a stud 136 fixed in an offset projection 137 on the hub of each of the spot carrying fingers, as shown in Figure 8.

At its lower end, the stem 132 carries a block 138 having a lateral extension 139 and mounted on the block is a roller 140. Carried by the bed plate 24 and bolted thereto, is a circular U-shaped rail 140' having upper and lower flanges 141 and 142 respectively, as shown in Figure 10. The roller 140 and block 138 are adapted to travel between the flanges 141 and 142 and the block 139 bears against the flange 141. As stated, there are a multiplicity of the spot carrying fingers and a similar mounting is provided for each of them.

It will be observed that since the block 139 disposed on one side of the center of the shaft 131 (see Figure 10) bears against the upper flange 141, and the stud 136 bears against the locating pin 135 on the opposite side of the axis of the shaft 131, that the fingers are normally maintained rigid. This is important in permitting the spot carrying dial to be driven by engagement of the fingers 127 with the ring gear on the cap transfer dial as the driving member, as shown in Figures 9 and 11.

*Spot punching machine transfer cam*

The circular flange 141 on the rail 140' shown in Figure 10 is cut away at 143, as shown in Figures 11 and 12, at a point adjacent the spot punching plunger to be later described. A block 144 is mounted on a flange 145 of the hub 146, which supports the shaft 126 about which the spot carrying dial rotates as shown in Figure 12. This block is secured to the flange 146 by means of bolts 147, which also secure the hub 146 to the bed plate 24.

The block 144 is provided with a slot 148 in which is pivotally mounted on a pin 149 a cam member 150. The cam member 150 is normally projected outwardly by means of the spring 152 carried in a recess 153 in the block. The extent of the outward projection of the cam 150 is such that the cam is positioned in the path of movement of the extension 139 carried by the block 138 on the base of the shaft 131. That is to say, the portion 143 being cut away in the upper flange 141 of the rail 140', the cam 150 is projected outwardly into said cut-away portion, so that its outer cam face 154 is substantially flush with the periphery of the remainder of the upper flange 141 of the rail. The cam face 154 is curved to conform to the curvature of the circular flange 141. The slot 148 is closed on one side by the inner wall of the rail 140', which forms a stop for movement of the cam 150 in one direction under the action of the spring and the wall 155 of the slot 148 formed in the block 144 limits the movement of the cam in the opposite direction.

*Transfer cam for spot to cap*

Referring to Figures 8 and 9, and particularly Figure 10, the lower flange 142 of the rail 140' is cut away as shown at 160 and opposite thereto the upper flange is cut away a considerably greater distance as shown at 161 in Figure 9. The lower flange 142 has an inwardly extending projection 163 as shown in Figures 8 and 9, and provided with a pair of upstanding ears 164 in which is pivotally mounted an arm 165 carrying a cam 166 fixed thereto, which, as shown in Figure 10, is provided with opposed inclined sides 167 and a straight face 168, the said inclined sides corresponding substantially to the bevel of the cut-away portion 160 in the lower flange. Fixed to the arm 165 and beneath the cam 166 is a downwardly extending stem 169, as shown in Figures 8 and 10, about which is disposed a spring 170 acting to normally draw the cam and its associated arm 165 downwardly. The tension of the spring 170 is adjustable with relation to the spring 134 on the spot carrier shaft 131, so that the two will substantially balance each other. It is desirable that the spring 170 be slightly stronger than the spring 134 to permit the spot carrier to be pulled down against the action of the spring 134 by the cam 166 when the roller 140 passes across the cut-away portion 160 in the lower flange of the rail 142.

The construction just described is associated with the transferring of the spot to the cap, while the construction described in connection with the cam 150 is associated with the punching-out of the spots from the strip material and their positioning in the spot carrier fingers.

*Spot cutting and feeding (G)*

Referring to Figure 14, a bracket 180 is mounted on the bed 24 adjacent the path of movement of the spot carrying fingers 128 and mounted on this bracket is a cutter holder 181, in which is mounted a suitable cutter 182 of circular configuration. This punch is reciprocated by means of a cross-arm 183 connected by a pair of studs 184 to a reciprocating cross-head 185 operated by an eccentric 186, shown in Figure 1, to which the lever 187 of the cross-head is connected. The foot 188 of the cutter cooperates with a die member 189 carried by the holder 181 and positioned above the die is a suitable stripper plate 190.

Referring to Figure 1, a bracket 191 is rigidly connected to the cross-frame 11 and has a suitable trunnion upon which is disposed a roll of the strip spotting material indicated at 192. This material is fed from the roll over a roller 193 and through a suitable U-shape throat 194 as shown in Figures 6 and 12, which throat is carried by an angular bracket 195 secured to the cross-head guide 196 for the cutter. Positioned in the throat 194 is a pivotally mounted friction shoe 197 which bears upon the strip material as it passes through the throat to maintain the same from wrinkling and keeps the same under tension, so that it lies flat. The strip material is drawn under the cutter 182 by means of the rollers 198 and 199, and the reciprocation of the cutter will sever a spot of the desired size. As will be observed, it is the waste portion of the strip material which is acted upon by the drawing rollers 198 and 199. These rollers are operated by an intermittent movement through the medium of a ratchet wheel 200 positioned on the shaft 201 of the roller 199, with which is engaged a pawl 202 carried by an arm 203 mounted on the shaft 201 and connected at its opposite end 204 to a link 205 having at its upper end a flexible connection 206 to a lever 207 which is fixed to the end of the shaft 37.

The upper roller 198 is freely mounted on a carrier yoke 208, which is pivoted on a pin 209, carried by a pair of arms 210 mounted on the bracket 180. The pivotal mounting for this roller enables it to exert pressure upon the lower roll 199 and in order that this pressure may be substantial so as to frictionally engage the strip material between the rollers, a suitable spring 211, as shown in Figure 14, is connected to the free end of one of the arms 208 in which the roller 198 is mounted, and connected at its other end to an eye 212 in a rod 212' secured to the said bracket 180. In order that the lower adhesive surface of the strip material may not adhere to the lower roll 199, I provide a suitable stripper member in association with said roll as indicated at 213, which stripper member is suitably mounted on the bracket 180 and preferably fixed thereto.

It will be noted that the shaft 37 when operated by the downward movement of the cross-head 33 carrying the tell-tale device 44 acts to move the lever 205 which, in turn, moves the pawl 202. This pawl engages the ratchet mechanism and causes the lower roll and the frictionally supported upper roll to engage the strip material and draw the same from the strip material roll 192 through the throat 194 by a step by step movement past the spot cutter 188—189, so as to provide a controlled feeding mechanism in accordance with the operation of the tell-tale device.

It will be seen, therefore, that when a shell having a cushion positioned therein is fed by the step conveyor 18 past the tell-tale device, that the shaft 37 will be reciprocated to feed the strip material to the cutter and that where a shell is fed without such cushion, the shaft 37 is not reciprocated and the feed of the strip material is halted until the next complete cap assembly is presented to the tell-tale device. This is also true where no shell is presented to the tell-tale.

*Spot carrier finger star wheel*

Referring to Figure 15, I have illustrated at 225 a bracket 226 bolted to the cutter holder bracket 195 and carrying a shaft 227 upon which is disposed a horizontal star wheel 228 positioned below the punching apparatus. This star wheel 228 is adapted to engage with the spot carriers 128 as shown in Figure 11, and to be rotated thereby. When such engagement takes place, the free ends of the spot carriers are held substantially fixed, while the opposite ends which are associated with the rotating spot carrier dial continue to rotate therewith.

Carried by the reciprocating cross-head 185 is a star wheel latch 229 adapted to be reciprocated by the cross-head in accordance with the movement of the cutter.

Referring to Figure 11, it will be observed that as the spot carrying dial rotates and the free ends 128 of the spot carriers 127 engage the star wheel, there takes place a simultaneous engagement of one of the teeth 230 of the star wheel with the latch 229 due to the downward or cutting position of the cutter in its operation to punch a spot from the strip material. In this manner, the free end 128 of each spot carrier finger 127 is held against movement by its engagement with the star wheel which in turn is held against rotation by the latch 229. It is understood, however, that during this brief temporary holding of the free end of the spot carrying finger so as to permit the positioning of a spot therein, that the spot carrier finger shaft 131 and associated parts continue to move with the rotating spot carrier dial, said shaft 131 pivoting in the openings 132, and this pivotal movement being permitted and guided by the resilient supported cam 150 on the spot carrier dial, all as shown in Figure 11.

Referring to Figure 12, I have illustrated a spot 231 severed from the strip 192 about to be positioned in the spot carrying finger 128. At this particular instant, the star wheel is engaged with the spot carrying finger which is to receive the spot so that the end of the finger is substantially fixed for the brief instant necessary to permit the disposing of the spot therein by the cutter foot 188 which moves downwardly an appropriate distance for this purpose. Referring to Figure 14, this downward movement of the cutter is controlled so as to dispose the spot 231 severed from the strip material upon the spot receiving shoulder 232 of the spot carrier as shown in detail in Figure 10. It is to be observed that the interior wall of each spot carrier is tapered and the shoulder 232 is of very slight dimension, being simply large enough to retain the spot and allow its ready removal through the other end of the spot carrier upon engagement by the plunger 84 of the cap transfer dial without mutilating the spot in any way.

The utility of the star wheel 228 and the cam 229, as well as the cam 150 carried on the spot transfer dial, will be described more in detail. In order to transfer a spot from the cutting die 189 to a spot carrier 128, as stated, it is necessary to hold the spot carrier in a fixed position. Also, it is necessary to have the spot carrier centered relative to the cutter and cutting die, so that in no manner will the spot be distorted in its transfer from the punching mechanism to the spot carriers. Hence, at the point where the star wheel 228 is retained by the latch 229 against rotation, with one of the spot carriers 128 in engagement with the star wheel, the free end of the spot carrier is held fixed with relation to the cutter. The carrier will accommodate itself to this operation, since the cut-away portion 143 will permit the spot carrier and shaft 131 to pivot or rotate in one direction, that is in a direction opposite to that of the rotation of the spot transfer dial, whereby the block 139 will engage the cam face 154 of the cam 150, so that while the block and roller and shaft move with the rotating spot carrier dial, the spot carrying finger is fixed with relation to the spot cutting die. In this manner, the interval of time controlled by the reciprocation of the cutter crosshead and the corresponding reciprocation of the cam 229, is sufficient to permit a spot to be inserted in the carrier finger upon the shoulder 232. As the cross-head reciprocates upward, the latch 229 is released from engagement with the star wheel and the next succeeding spot carrier engages the star wheel and rotates it until the downward movement of the cross-head brings about an engagement of the parts as just described and illustrated in Figure 11, whereby the star wheel is held against rotation and the spot carrier finger is centered with relation to the cutter and cutter die.

Spot transfer

Referring to Figures 8, 9 and 10, I have illustrated the manner in which the spot is transferred from the spot carriers and positioned upon the cushion liner of the cap. The spot carrier dial by reason of its rotation brings the spot directly above the crown having the cushion to be spotted and brings the roller 140 to the transfer point 99, where, by reason of engagement of the roller with the cam 166 and the cut-away portions 160 and 161, and spring 170, as shown in Figure 10, the spring mounted spot carrier is moved downwardly. This downward movement of the spot carrier fingers 127, by reason of the engagement of the spot carrier fingers with the gear 82, produces a centering of the spot carrier with relation to the cap carried by the fingers 78, the carrier being registered into substantial alignment with the recesses between the teeth of the gear due to its intermeshing engagement with the gear. The cap being freely carried by the cap transfer dial, the inner wall of its skirt 233 is engaged by the tapered external lower wall 234 of the spot carrier as shown in Figure 10, whereby the spot carrier is centered with relation to the cap and the spot is centered with relation to the cushion. Simultaneous with this centering of the spot carrier in the shell of the cap, the plunger 84 is projected into the vertical position as shown in Figure 10, and the foot thereof 92 presses the spot past the shoulder 232 of the spot carrier out of the open end thereof and the spring 109 exerts sufficient pressure upon the foot to unite the spot to the cushion. The plunger 84 also acts to move the spot carrier downwardly to the position shown in Figure 10.

As soon as this centering and positioning operation is completed, the spot carriers are free of the cam 166 and by reason of the spring 134 are returned to normal position. The spot carrier fingers 127, it will be noted, are provided with slots or openings 234' in their ends 128 and as shown in Figure 9, as the spot carrier dial continues its movement, these openings permit the carriers to pass clear of each plunger shaft 108 of the plungers 84. This is necessary for the reason that the plunger foot 92, by reason of the construction and arrangement of the lift and pressure cams carried by the cap transfer dial, is continuously maintained in engagement with the spot upon the cushion for a required period of time after the centering and positioning operation has been completed. In fact, the plunger 84 need only be returned to its normal position at such a time as will remove it from the path of the transfer mechanism for removing the assembled caps from the transfer dial to the pressure dial 72. Referring to Figure 7a, it will be noted that the pressure cam 96 extends for the required distance from the centering point 99 in order to assure the continuous engagement of the pressure foot with the spot upon the cushion for the desired period.

Cap transfer

The completed spot caps are carried by the cap transfer dial toward the pressure dial 72 and are removed from the transfer dial by engagement with the transfer cam 105 carried on the cross member 95, which is fixed to the frame 11, as shown in Figures 6 and 13. Simultaneously with the transfer of the caps from the transfer dial by means of the cam 105, the roller 101 on the rotating pressure dial engages the cam 100 on the cross member 95, whereby the pressure plunger 102 is reciprocated and a cap positioned in a pocket 236 formed in the cap carrier ring of the pressure dial 104. Thereafter, the roller 101 and cam 100 being disengaged by the rotary movement of the pressure dial, the plunger foot 237 of the pressure plunger 102 engages the cap to compress the spot and cushion within the shell and complete the assembly. It will be understood that a multiplicity of the plungers 102 and pockets 236 are provided to accommodate any desired number of caps in accordance with the size of the pressure dial.

In the case of some adhesives, it is necessary that they be dried or hardened by means of heat and for this purpose the cap carrying ring 104 is continuously heated by means of a gas burner 238 bolted to the frame 11 as shown at 239.

Upon completing its rotary travel in the pressure dial, the cap is discharged therefrom. This is accomplished through the medium of the cam 100 which engages the roller 101 to raise the same and the plunger 102 and the caps as thus released on the pressure dial are carried into engagement with an ejector finger 240. This finger removes the caps from the pressure dial and directs them into the chute 241 onto a rotating plate 242, from which they are removed by a rotating vane 243 to an endless conveyor or belt 244. By means of the belt, the completely assembled caps are transferred to any desired point.

Upon reference to Figure 13, it will be observed that the plate 242 and the conveyor 244 are driven from the main shaft 5 by suitable intermediate gearing associated with the shaft 69.

Spot moistener

Figure 16:
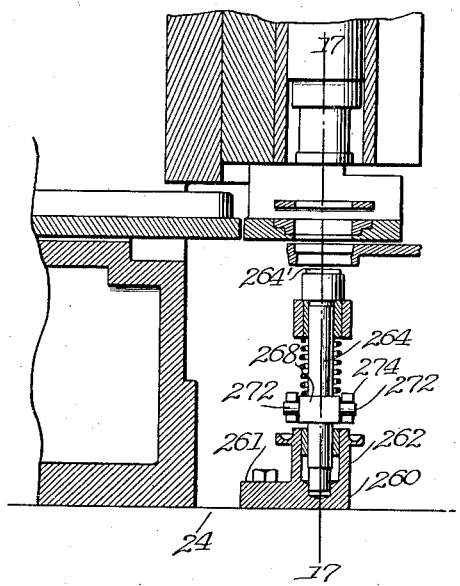
Figure 16 is a cross-section on the line 16—16 of Figure 17, illustrating a spot moistening device positioned beneath a spot punch.
Figure 17:
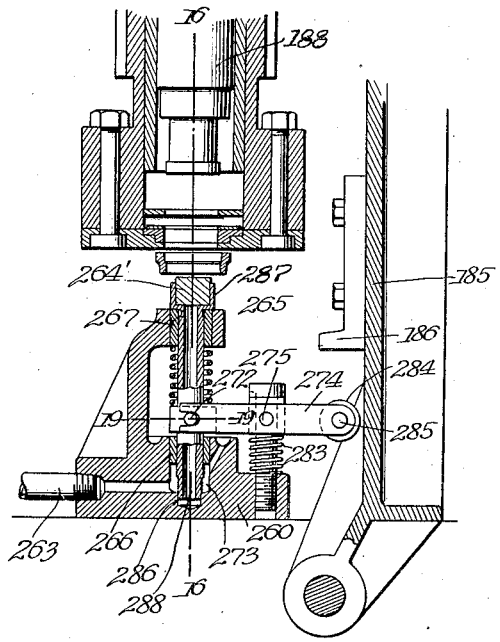
Figure 17 is a cross-section on the line 17—17 of Figure 16.
Figure 18:
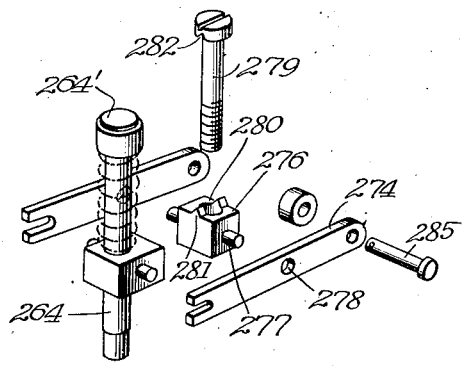
Figure 18 is a perspective view of the parts for operating the moistening plunger shown in Figure 17.

Referring to Figures 16, 17, 18 and 19, there is mounted below the punch upon the bed 24 a spot moistening device comprising a bracket 260 bolter to the bed 24 at 261 and having an upstanding hollow portion 262 forming a reservoir or well for a suitable moistening liquid, such as water. In Figure 17, I have shown a pipe or tube 263 communicating with the well or reservoir 262 for maintaining a suitable water level therein and in a hollow plunger 264 adapted to be reciprocated in the said well. The water level is maintained to the top of the plunger so as to be substantially in contact with a moistening element 264' so that the same will be constantly moistened.

Figure 19:
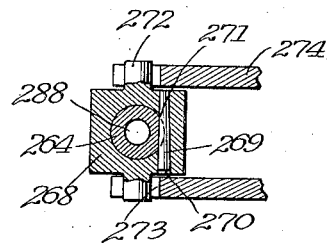
Figure 19 is a cross-section on the line 19—19 of Figure 17.

The plunger 264 at its upper end is guided in an opening 265 formed in the upper end of the bracket 260. The bracket is provided with suitable bushings 266 and 267 to engage the ends of the plunger. The plunger carries a block 268 fixed thereto by means of a pin 269 engaging in an opening 270 in the block and a corresponding recess 271 in the outer wall of the plunger as shown in Figure 19. The block is provided with lugs or pins 272, which are received in the slotted ends 273 of a pair of levers 274 pivotally mounted at 275 upon a block 276. The block 276 is provided with lugs 277 engaging in openings 278 of the levers, whereby pivotal supporting of the levers is accomplished. A suitable adjusting screw 279 is threaded into the base of the bracket 260, as shown in Figure 17, and this screw passes loosely through an opening 280 in the said block 276. The upper face of the block 276 is provided with a pair of fulcrum points 281, which engage in corresponding notches 282 in the lower face of the head of the adjusting screw 279. A spring 283 is confined between the top of the bracket 260 and the bottom of the block 276 to maintain the fulcrum points and notches in engagement and afford a flexible pivotal mounting for the levers. The opposite ends of the levers 274 carry a roller 284 which is freely rotatable upon a pin 285 carried by the ends of the levers. The reciprocating cutter or punch cross-head 185 is provided with a cam 186 adapted to contact with the said roller in its reciprocating movement and in turn reciprocate the plunger 264.

Referring to Figure 17, the well 262 is provided with a reduced portion 286 and the plunger at its lower end is correspondingly reduced, so that a relatively snug sliding fit between the two reduced portions is obtained.

As the punch cross-head 185 moves downwardly to engage the cutter with the strip material, the cam 186 will engage the roller 284 to move the levers 274, so that they project the plunger 264 upwardly. At its upper end the plunger 264 is recessed at 287 in which recess is disposed the moistening element 264' such as a felt or other absorbent pad. The amount of upward movement of the plunger is relatively slight, as will be observed from Figure 17, where the plunger is in its retracted position and since the plunger is simultaneously actuated with the cross-head for the punch mechanism, the moistening member engages the under-surface of the spot at the time that the foot of the cutter is in engagement with the spot on the opposite side thereof. That is to say, the engagement of the moistening member 264' and the foot of the punch upon opposite sides of the spot takes place precisely at the time that the spot is being positioned within the spot carrier and upon the shoulder 232 thereof.

A coil spring confined between the block 268 and the bushing 267 returns the plunger to the normal position shown in Figure 17, when the roller 284 is released from the cam 186 as the latter rises with the cross-head.

As heretofore stated, a relatively snug sliding fit is obtained between the reduced portion 286 of the well and the corresponding end of the plunger and this enables the proper wetting of the moistener element 264'. That is, the water in the reduced portion of the well is a relatively small body and as the plunger reciprocates to bring its reduced end into this reduced portion of the well, there results a hydraulic pressure, acting upon the column of water in the hollow portion 288 of the plunger whereby the water is forced into the moistening element.

*Spot carrier stop mechanism*

In lieu of the star wheel 228, I will use the mechanism illustrated in Figures 25, 26, 27, 28 and 29 to transfer the spots from the punch mechanism to the spot carrier dial. Mounted on the bracket 180 which supports the punch holder and below the female die 189 and the spot carrier finger 127 is a bracket 300 bolted to the bracket 180 as shown in Figure 25. Pivotally mounted on the bracket 300 at 301 is a horizontally extending arm 302. The arm 302 has a lateral extension 303 slotted as shown at 304 and pivoted between the sides of the slotted extension by a pivot pin 305 is a spot carrier stop finger 306. Mounted on the bracket 301 and integral therewith is a housing 307 disposed in the rear of the slotted extension 303 on the arm 302. Pivotally connected in a recess in the arm opposite the extension 303 is a rod 308 which extends through the said housing and adjustably connects the arm and the housing and bracket by means of the threaded engagement of a nut 309 with the threaded end 310 of the rod. A spring 311 surrounds the rod 308 and is confined within the housing 307 and the wall of the arm 302 adjacent the recess in which the rod is pivoted, as best shown in Figure 28. The finger 306 is provided with an extension 312 carrying a roller 313 which engages in a cam slot of the contour shown at 314 in Figure 29 and formed in a plate 315. The plate 315 in which the slot is formed is bolted to the reciprocating cross-head 185 by bolts 316 and the plate is provided with elongated slots 317 through which the bolts pass whereby the plate may be adjustably mounted to properly position the cam slot and control the movement of the cam 313 and the finger 306 on its pivot 305.

Referring to Figure 28, the arm 302 may move with relation to the bracket 300 against the action of the spring 311, and any such movement of the arm 302 will be guided by the laterally extending arms 318 formed on the bracket 300 illustrated in Figure 28.

As the cross-head 185 reciprocates downwardly, carrying with it the punch, and the plate 315, the roller 313 follows the slot 314 in the plate and moves the end of the finger 306 outwardly into the path of the spot carrier fingers 127. Referring to Figure 26, it will be observed that the finger 306 is in a position maintaining the end 128 of the spot carrying finger against rotary movement with the dial, that is, the spot carrying finger is permitted to pivot upon the dial through the instrumentality of the shaft 131 and the cam 150 shown in Figure 11. At this particular moment, the foot of the punch positions a spot which has been cut from the strip material within the opening in the spot carrier 127 upon the shoulder 232 thereof as described in connection with Figures 8, 9, 10, 11 and 12. The end of the spot carrier finger which is engaged by the finger 306 is held in this stationary position for a sufficient period of time to permit the positioning of the spot therein, the other end of the spot carrying finger, however, moving with the rotating spot carrier dial.

In its normal reciprocatory movement the cross-head 185 moves upwardly carrying with it the plate 315 and the roller 313 follows the cam slot to disengage the finger 306 from the end of the spot carrier finger 127 and the said carrier resumes its normal position.

The reciprocatory movement of the punch holder causes the finger 306 to move back and forth and engage each succeeding spot carrier finger to hold it for the spot positioning operation. In this connection, the arm 302 is recessed as shown at 319 to receive the curved portion 320 of the finger 306 when it is retracted.

By reason of this construction, if for any reason the engagement between the fingers 306 and 127 should tend to be prolonged due to breakage or faulty operation of the parts, the arm 302 will be retracted against the action of the spring 311 within the slot provided by the arms 318 so that there is no opportunity for the finger 306 to tear or break the spot carrying fingers from the dial or for the arm 302 to wobble and be distorted.

Strip material—Spot caps

Referring to Figure 20, I have illustrated a portion of a strip of spotting material. As shown in Figure 21, this strip will comprise a layer of foil or varnished paper 350 and on the opposite surface will have an adhesive coating 351. The spots as cut from the strip material in accordance with this invention are indicated in detail in Figure 22 at 352 and such spots may be of less area than the cushion liner to which they are affixed or constitute an overall facing therefor.

In Figure 24, I have shown a so-called spot crown comprising a metal shell 353 having a crimped skirt 354, a cushion liner 355 and a center spot 352 of smaller diameter than the cushion liner. It is to be understood that in addition to being adapted for the manufacture of spot crowns, the present machine is likewise useful in connection with the making of screw caps, lug caps and divided thread caps having an overall liner.

Adhesives

I have referred herein to a cap in which the adhesives for affixing the cushion to the crown and the spot to the cushion are hardened by heat, this being accomplished in the pressure dial 72.

However, instead of a heat hardened or set adhesive, I may have re-course to any of the various types of adhesives, now available.

For example, if a heat coagulable adhesive such as albumen is employed to adhere the cushion to the crown, and a thermoplastic adhesive of the type of gutta percha is employed as the means of adhering the spot to the cushion, I will interpose between the point of application of the albumen and the spot transfer point 99, a suitable heat and pressure applying means. This heating means may comprise a gas jet, a closed oven or an electrical resistance associated with the conveyor or with the transfer dial or both. Preferably the heating means will act on the shell whereby not only is the cushion adhered to the shell but the temperature of the cushion is raised so that the thermoplastic adhesive of the spot applied thereto will be suitably softened. In this manner the cushion is adhered to the shell before the application of the spot and the cushion is conditioned to receive the spot whereby the spot adhesive is softened and may be subsequently permitted to cool and set.

Also, heating means associated with the transfer dial either to heat the cushion or associated with the presser foot 92, are employed for the purpose of softening the spot adhesive. Such heating means may comprise a gas jet or an electrical resistance, the latter preferably associated with the presser foot 92 and the former directed upon the cushion or upon the base of the presser foot.

Thereafter the assembled cap wil be transferred to the pressure dial and the heater thereof may be omitted.

Stated briefly, I will set the albumen adhesive by a heating means disposed between the point of application of the cushion to the shell and the transfer point of the spot to the cushion; and while the cap is travelling in the transfer dial, either the cushion will be heated by means associated with the dial or the foot 92 of each spot applying plunger 84 will be heated to adhere the spot.

In the case where heat hardened adhesives are used to adhere the cushion to the shell, I may accomplish this hardening while the spot having a thermoplastic adhesive is being applied, the heat necessary for softening the spot adhesive serving, if necessary, to finally harden the cushion adhesive. Briefly, the cushion is adhered to the shell while the spot is being applied thereto and the cap is subsequently permitted to cool and harden the spot adhesive. Suitable heating means associated with the cap transfer dial and preferably heating the shell and cushion will be employed. The heating means also may be associated with the conveyor as previously described and with the presser foot 92.

Again, heat hardened adhesives may be used for adhering both the cushion to the shell and the spot to the cushion. Thus, by suitable heating means associated with the transfer dial, the cushion will be adhered to the shell after the spot is applied to the cushion. That is, heating means associated with the conveyor and/or the transfer dial and also associated with the presser foot if necessary will be utilized to harden the adhesives after the spot has been applied to the cushion. Likewise, the cushion may be adhered to the shell and the spot to the cushion simultaneously. In connection with heat hardened adhesives instead of hardening and setting the adhesives in the transfer dial, this will sometimes be accomplished in the pressure dial.

Also, thermoplastic adhesives will be used for adhering the cushion to the shell and the spot to the cushion. Thus, by suitable heating means associated with the conveyor and/or the spot transfer dial, the adhesives will be softened and rendered adhesive in the transfer dial and then allowed to cool and harden in the pressure dial. For example, where the thermoplastic adhesive for the cushion is a lacquer coated on the shell or the cushion, the cushion may be adhered to the shell either on the conveyor or on the transfer dial by any suitable heating means which will soften the adhesive and before the spot is applied and the spot adhesive softened either by the raised temperature of the cushion or by means of the heated plunger foot 92. The cushion adhesive may have cooled prior to the application of the spot, but in any event the application of the spot will not interfere with this union and the two adhesives will be permitted to cool and harden, for example in the pressure dial. Likewise the two adhesives may be simultaneously softened and rendered adherent.

It will be observed therefore that the present apparatus permits spot caps to be produced by a continuous operation utilizing a succession of metal shells with means for inserting the cushion liner in each shell and positive means for applying a spot upon each complete cushion cap assembly.

That is, each successive cushion cap assembly is registered with the spot forming device and where in the succession of shells a gap occurs or an incomplete assembly exists, no spot will be fed. The adhering of the spot and cushion in the assembly may be accomplished in various ways and as stated heating means will be employed in association with the conveyor, the cap transfer dial, and if desired in association with the spot transfer dial. This heating means may be applied to the dial proper or to the presser foot 92. In this connection, instead of a moistening means 264', as shown in Figures 16 and 17, the punch 188 may be suitably heated by means 504 as where the strip material is provided with a thermoplastic adhesive to soften the same and render it adhesive. The use of the heater in association with the pressure dial 72 will, as explained, be optional.

In the drawings the heating means associated with the conveyor is indicated at 500, that associated with the cap transfer dial at 501, that associated with the presser foot 92 at 502, and, if desired, the heating means will be associated with the spot carriers 128 at 503. These various heating means will be of conventional design and either constitute an electric resistance or a burner type of heater as desired. For this reason the heating means have not been specifically illustrated.

I have provided an automatic apparatus for continuously forming spot caps which will be universally applicable with all types of adhesive and, although particularly designed for manufacturing caps wherein the center spot is of less diameter than the cushion, may be employed in the manufacture of caps wherein the cushion and facing layer are coextensive.

In the case where pressure-sensitive adhesives are employed, it will be clear that the pressure incident to the applying of the cork disc to the shell, and the positioning of the spot upon the cushion, as well as the pressure maintained in the pressure dial, will be sufficient to cause the adhesive to set.

*Safety stop device*

Referring to Figure 14, a bracket 400 is bolted at 401 to the table 24. Slidably supported by the bracket is a stem 402 carrying a spring 403 confined between the bracket and the head or stop 406 fixed to the stem.

One end of the stem slidably projects through the bracket and is aligned with a push button 404 carried in a suitable electrical fitting 405.

The other end of the stem slidably extends through and is guided by an opening in the table 24 and a cut-away portion in the lower rail 142 of the spot carrier dial.

In this manner, should the spot punch 188 for any reason strike spot finger 127 and depress the same, as when a misalignment of parts occurs, the block 138, 139 on stem 132 will strike the adjacent end of the stem 402, to cause the opposite end thereof to engage and depress the push button 404 and in this manner, shut off the current to stop the operation of the entire machine.

A similar or equivalent structure will be associated with the tell-tale device if desired.

*Relation of cap transfer dial E to spot carrier dial F*

Since the machine is entirely automatic, it is important that the spots and crowns be fed in a predetermined manner, so that at the point of application 99 of a spot to a crown, there will, at all times, be present these two components of the cap.

Therefore, the distance from the cushion applying station C to the point 99 will be equal to the distance from the spot punching station G to the point 99. In this manner, for each cushioned cap carried on the conveyor 18 from the station C, a spot will be cut and positioned in a finger 127.

Where a defect renders the tell-tale device operative, as where a cushion is not applied or no cap is presented to the tell-tale device, then the feed of the spot material will be halted and at the point 99, the defective crown or empty dial pocket, as the case may be, will not be presented with a spot.

It will be understood, of course, that any equivalent arrangement for presenting a spot and a cushion shell or similar semi-complete cap assembly at the point 99 may be employed, the construction illustrated and described being one example of a means for assuring that at the point 99 a cushion shell assembly and spot will always be presented.

I claim:

1. A machine of the class described for forming spot caps by a continuous operation comprising means for feeding a succession of metal shells, means for inserting a cushion liner in each shell, means for continuously moving said cushion and shell, means for consecutively forming spot discs from strip spotting material, means for feeding and applying a spot in centered relation to each cushion while the latter is being moved by said means, and mechanism for controlling the operation of all of said means during travel of the shells through the machine.

2. A machine of the class described for forming spot caps by a continuous operation comprising means for feeding a succession of metal shells, means for inserting a cushion liner in each shell, means for continuously forming spot discs of less diameter than the cushion liner, means for registering that a complete cushion-shell assembly is being fed through the machine, said last mentioned means associated with the spot forming means for preventing formation of a spot when a shell without a cushion is fed through the machine, means for feeding a spot disc and applying the same in centered relation upon the cushion in each shell, and mechanism for controlling the operation of all of said means during travel of the shells through the machine.

3. A machine of the class described for forming spot caps by a continuous operation comprising means for feeding a succession of metal shells, means for inserting a cushion liner in each shell, means for feeding strip spotting material, means for punching a succession of spot discs of less diameter than the cushion liner therefrom, means for halting the feed of the strip spotting material when a shell without a cushion is fed through the machine whereby a spot is not formed, means for feeding a spot disc and applying the same in centered relation upon the cushion in each shell, and mechanism for controlling the operation of all of said means during travel of the shells through the machine.

4. A machine of the class described for forming spot crowns by continuous operation comprising means for feeding a succession of metal shells, means for inserting a cushion liner in each shell, means for feeding strip spotting material, means for punching a succession of spot discs of less diameter than the cushion liner therefrom, means for registering that a complete cushion-shell assembly is being fed through the machine, means cooperating with said last named means for halting the feed of the strip spotting material when a shell without a cushion is fed through the machine whereby a spot is not formed, means for feeding a spot disc and applying the same in centered relation upon the cushion in each shell, a mechanism for controlling the operation of all of said means during travel of the shells through the machine.

5. A machine of the class described for forming spot caps by a continuous operation comprising means for feeding a succession of metal shells, means for inserting a cushion liner in each shell, means for continuously moving said cushion and shell, means for feeding a spot disc of less diameter than the liner and applying the same in centered relation upon the cushion in each shell while the latter is being moved by said means, means for causing the cushion to unite to the shell after the disc is applied thereto, and mechanism for controlling the operation of all of said means during travel of the shells through the machine.

6. A machine of the class described for forming spot caps by a continuous operation comprising means for feeding a succession of metal shells, means for inserting a cushion liner in each shell, means for continuously moving said cushion and shell, means for feeding a spot disc of less diameter than the liner and applying the same in centered relation upon the cushion in each shell while the latter is being moved by said means, means for simultaneously causing the cushion to unite to the shell and the disc to the cushion, and mechanism for controlling the operation of all of said means during travel of the shells through the machine.

7. A machine of the class described for forming spot caps by a continuous operation comprising means for feeding a succession of metal shells, means for inserting a cushion liner in each shell, a continuously moving cap transfer dial, a spot disc carrier, means for successively transferring each shell-cushion assembly to said transfer dial, means for applying a spot disc from said spot disc carrier to the cushion of each shell carried by the cap transfer dial while the latter is moving, and means for removing each shell-cushion-disc assembly from said transfer dial.

8. A machine of the class described for forming spot caps by a continuous operation comprising means for feeding a succession of metal shells, means for inserting a cushion liner in each shell, a cap transfer dial, a continuously moving spot disc carrier, means for successively transferring each shell-cushion assembly to said transfer dial, means for applying a spot disc from said spot disc carrier to the cushion of each shell carried by the cap transfer dial while the latter is moving, means for centering each disc with relation to the cushion, and means for removing each shell-cushion-disc assembly from said transfer dial.

9. A machine of the class described for forming spot caps by a continuous operation comprising means for feeding a succession of metal shells, means for inserting a cushion liner in each shell, a continuously moving cap transfer dial, a spot disc carrier, means for successively transferring each shell-cushion assembly to said transfer dial, means for applying a spot disc from said spot disc carrier to the cushion of each shell carried by the cap transfer dial while the latter is moving, means for adhering the disc to the cushion, and means for removing each shell-cushion-disc assembly from said transfer dial.

10. A machine of the class described for forming spot caps by a continuous operation comprising means for feeding a succession of metal shells, means for inserting a cushion liner in each shell, a continuously rotating cap transfer dial, a rotating spot disc carrier, means for transferring each successive shell-cushion assembly to said transfer dial, means for applying a spot disc from said spot disc carrier to the cushion of each shell carried by the cap transfer dial while the latter is moving, and means for removing each shell-cushion-disc assembly from said transfer dial.

11. A machine of the class described for forming spot caps by a continuous operation comprising means for feeding a succession of metal shells, means for inserting a cushion liner in each shell, a cap transfer dial, a spot disc carrier, means for simultaneously and continuously rotating said dial and carrier, means for transferring each successive shell cushion assembly to said transfer dial, means for applying a spot disc from said spot disc carrier to the cushion of each shell carried by the cap transfer dial, and means for removing each shell-cushion-disc assembly from said transfer dial.

12. A machine of the class described for forming spot caps by a continuous operation comprising means for feeding a succession of metal shells, means for inserting a cushion liner in each shell, a cap transfer dial, a spot disc carrier, said carrier and dial being continuously rotated in geared relation, means for transferring each successive shell cushion assembly to said transfer dial, means for applying a spot disc from said spot disc carrier to the cushion of each shell carried by the cap transfer dial, and means for removing each shell-cushion-disc assembly from said transfer dial.

13. A machine of the class described for forming spot caps by a continuous operation comprising means for feeding a succession of metal cap shells, means for inserting a cushion liner in each shell, a continuously moving cap transfer dial, means carried thereby for receiving and carrying each successive shell cushion assembly, means for moving said dial, a spot disc carrier, means for moving said spot disc carrier with relation to the dial, means for positioning spots successively in said carrier, said carrier and dial reaching a position in their respective movements with a spot superposed above a cushion, means for removing a spot from the carrier and applying it upon the cushion while the dial is moving, and means for removing each shell-cushion-disc assembly from said transfer dial.

14. A machine of the class described for forming spot caps by a continuous operation comprising means for feeding a succession of metal cap shells, means for inserting a cushion liner in each shell, a cap transfer dial, means carried thereby for receiving and carrying each successive shell cushion assembly, means for moving said dial in one direction, a spot disc carrier moving in the opposite direction, means for positioning a spot in said carrier, said carrier and dial reaching a position in their respective movements with a spot superposed above a cushion, means for removing the spot from the carrier and applying it upon said cushion while said dial and carrier are moving, and means for removing each shell-cushion-disc assembly from said transfer dial.

15. A machine of the class described for forming spot caps by a continuous operation comprising means for feeding a succession of metal cap shells, means for inserting a cushion liner in each shell, a cap transfer dial, means carried thereby for receiving and carrying a succession of shell cushion assemblies, means for moving said dial in one direction, a spot disc carrier continuously moving in the opposite direction, means for positioning a succession of spots in said carrier, said carrier and dial reaching a position in their respective movements with the spots successively superposed above the successive cushions, means for successively removing a spot from the carrier and applying it upon each cushion while the same is moving, and means for removing the shell-cushion-disc assemblies from said transfer dial.

16. A machine of the class described for forming spot caps by a continuous operation comprising means for feeding a succession of metal cap shells, means for inserting a cushion liner in each shell, a cap transfer dial, means carried thereby for receiving and continuously carrying a shell cushion assembly, means for moving said dial in one direction, a spot disc carrier moving in the opposite direction, means for positioning a spot in said carrier, said carrier and dial reaching a position in their respective movements a spot superposed above a cushion, means for removing the spot from the carrier and applying it in centered relation upon said cushion while the same is moving, said last mentioned means carried by said dial and automatically operable to a position pressing the spot upon the cushion, and means for removing the shell-cushion-disc assembly from said transfer dial.

17. A machine of the class described for forming spot caps by a continuous operation comprising means for feeding a succession of metal cap shells, means for inserting a cushion liner in each shell, a cap transfer dial, means carried thereby for receiving and carrying a shell cushion assembly, means for continuously moving said dial in one direction, a spot disc carrier moving in the opposite direction, means for positioning a spot in said carrier, said carrier and dial reaching a position in their respective movements with a spot superposed above a cushion, means for removing the spot from the carrier and applying it upon said cushion while the same is moving, said last mentioned means automatically operable to press a spot upon the cushion substantially throughout the period of travel of the shell-cushion-disc assembly in said dial, and means for removing the shell-cushion-disc assembly from said transfer dial.

18. A machine of the class described for forming spot caps by a continuous operation comprising means for feeding a succession of metal cap shells, means for inserting a cushion liner in each shell, a cap transfer dial, means carried thereby for receiving and carrying a shell cushion assembly, means for moving said dial in one direction, a spot disc carrier continuously moving in the opposite direction, means for positioning a spot in said carrier, said carrier and dial reaching a position in their respective movements with a spot superposed above a cushion, means for removing the spot from the carrier and applying it upon said cushion while the same is moving, said last mentioned means operable to press the spot upon the cushion and automatically movable from such engagement to permit the shell-cushion-disc assembly to be removed from the machine, and means for removing the shell-cushion-disc assembly from said transfer dial.

19. A machine of the class described for forming spot caps by a continuous operation comprising means for feeding a succession of metal cap shells, means for inserting a cushion liner in each shell, a cap transfer dial, means carried thereby for receiving and carrying a shell cushion assembly, means for moving said dial in one direction, a spot disc carrier moving in the opposite direction, means for positioning a spot in said carrier, said carrier and dial reaching a position in their respective movements with a spot superposed above a cushion, means for removing the spot from the carrier and applying it upon said cushion while the latter is moving, said last mentioned means comprising a heated pressure member, and means for removing the shell-cushion-disc assembly from said transfer dial.

20. A machine of the class described for forming spot caps by a continuous operation comprising means for feeding a succession of metal cap shells, means for inserting a cushion liner in each shell, a cap transfer dial, means carried thereby for receiving and carrying a shell cushion assembly, means for moving said dial in one direction, heating means associated with said transfer dial, a spot disc carrier moving in the opposite direction, means for positioning a spot in said carrier, said carrier and dial reaching a position in their respective movements with a spot superposed above a cushion while the latter is moving, means for removing the spot from the carrier and applying it upon said cushion, and means for removing the shell-cushion-disc assembly from said transfer dial.

21. A machine of the class described for forming spot caps by a continuous operation comprising means for feeding a succession of metal cap shells, means for inserting a cushion liner in each shell, a cap transfer dial, means carried thereby for receiving and carrying a shell cushion assembly, means for moving said dial in one direction, a spot disc carrier moving in the opposite direction, means for positioning a spot in said carrier, heating means associated with said disc carrier, said carrier and dial reaching a position in their respective movements with a spot superposed above a cushion, means for removing the spot from the carrier and applying it upon said cushion while the latter is moving, and means for removing the shell-cushion-disc assembly from said transfer dial.

22. A machine of the class described for forming spot caps by a continuous operation comprising means for feeding a succession of metal cap shells, means for inserting a cushion liner in each shell, a cap transfer dial, means carried thereby for receiving and carrying a succession of shell cushion assemblies, means for moving said dial in one direction, a spot disc carrier moving in the opposite direction, means for forming successively a multiplicity of disc spots, means for positioning a succession of spots in said carrier while the latter is moving, said carrier and dial reaching a position in their respective movements with a spot superposed above a cushion, means for removing each spot from the carrier and applying it upon a cushion, and means for removing the shell-cushion-disc assembly from said transfer dial.

23. A machine of the class described for forming spot caps by a continuous operation comprising means for feeding a succession of metal cap shells, means for inserting a cushion liner in each shell, a cap transfer dial, means carried thereby for receiving and carrying a succession of cushion shell assemblies, means for moving said dial, a spot disc carrier, means for moving said carrier, means for forming a multiplicity of disc spots, means for positioning a succession of spots in said carrier, means controlling the preparation of said spots to produce a spot for each complete cushion shell assembly on said dial, said carrier and dial reaching a position in their respective movements with a spot superposed above a cushion, means for removing the spot from the carrier and applying it upon said cushion while the latter is moving with said dial, and means for removing the shell-cushion-disc assembly from said transfer dial.

24. A machine of the class described for forming spot caps by a continuous operation comprising continuously moving means for supporting a succession of cushion shell assemblies, means associated therewith for continuously feeding a multiplicity of spot discs of substantially less diameter than the shells into registry with said assemblies, and means for applying a spot to and centering on each cushion during said continuous movement.

25. A machine of the class described for forming spot caps by a continuous operation comprising continuously moving means for supporting a succession of cushion shell assemblies, means for continuously forming a multiplicity of spot discs, means operable when a gap occurs or when a shell without a cushion is present in the succession of cushion shell assemblies to render said disc forming means incapable of forming a disc, means for successively feeding a multiplicity of spot discs to said assemblies, means for applying a spot in centered relation to each cushion while being moved by said first-named means, and means for removing the cushion-shell-disc assemblies from the machine.

26. A machine of the class described for forming spot caps by a continuous operation comprising continuously moving means for supporting a succession of cushion shell assemblies, means for continuously forming a multiplicity of spot discs comprising a punch member and means for supplying a strip of spotting material thereto, a carrier for receiving successive spot discs from said punch, said carrier feeding said discs to said assemblies, means for applying a spot to each cushion while being moved by said first-named means, and means for removing the cushion-shell-disc assemblies from the machine.

27. A machine of the class described for forming spot caps by a continuous operation comprising continuously moving means for supporting a succession of cushion shell assemblies, means for continuously forming a multiplicity of spot discs comprising a punch member and means for supplying a strip of spotting material thereto, a carrier moving past said punch and having spot disc receiving members, said members movable with relation to said punch to assume a substantially fixed position for receiving successively the spots formed by said punch, said carrier feeding said discs to said assemblies, means for applying a spot to each cushion while being moved by said first-named means, and means for removing the cushion-shell-disc assemblies from the machine.

28. A machine of the class described for forming spot caps by a continuous operation comprising continuously moving means for supporting a succession of cushion shell assemblies, means for continuously forming a multiplicity of spot discs comprising a punch member and means for supplying a strip of spotting material thereto, a carrier moving past said punch and having movable spot disc receiving members, said members normally held fixed in position on said carrier, means associated with said punch and said carrier for moving said members to a position to receive a spot punched from said strip and holding said members substantially fixed with relation to the punch while a spot is being positioned therein, said members automatically resuming their normal fixed position after a spot is disposed therein, said carrier feeding said discs to said assemblies, means for applying a spot to each cushion while being moved by said first-named means, and means for removing the cushion-shell-disc assemblies from the machine.

29. A machine of the class described for forming spot caps by a continuous operation comprising continuously moving means for supporting a succession of cushion shell assemblies, means for continuously forming a multiplicity of spot discs comprising a punch member and means for supplying a strip of spotting material thereto, means for rendering the adhesive on the spots formed from said strip by said punch adherent, a carrier for receiving successive spot discs from said punch, said carrier feeding said discs to said assemblies, means for applying a spot to each cushion while being moved by said first-named means, and means for removing the cushion-shell-disc assemblies from the machine.

30. A machine of the class described for forming spot caps by a continuous operation comprising continuously moving means for supporting a succession of cushion shell assemblies, means for continuously forming a multiplicity of spot discs comprising a punch member and means for supplying a strip of spotting material thereto, means associated with said punch member for stopping the strip supply should a defective operation occur, a carrier for receiving successive spot discs from said punch, said carrier feeding said discs to said assemblies, means for applying a spot to each cushion while being moved by said first-named means, and means for removing the cushion-shell-disc assemblies from the machine.

31. A machine of the class described for forming spot caps by a continuous operation comprising a conveyor adapted to receive a succession of metal cap shells and transfer the same by a step by step movement, means for applying a cushion in each successive shell, a continuously rotating transfer dial receiving the cushion shell assemblies from said conveyor, a continuously rotating spot disc carrier, said carrier and transfer dial reaching a position in their respective movements with a spot superposed above a cushion, means for removing the spot from the carrier and applying it upon each cushion, and means for removing each shell-cushion-disc assembly from said transfer dial.

32. A machine of the class described for forming spot caps by a continuous operation comprising a conveyor adapted to receive a succession of metal cap shells and transfer the same by a step by step movement, means for applying a cushion in each successive shell, a continuously rotating transfer dial receiving the cushion shell assemblies from said conveyor, a continuously rotating spot disc carrier, said carrier and transfer dial reaching a position in their respective movements with a spot superposed above a cushion, means for removing the spot from the carrier and applying it upon each cushion, means for removing each shell-cushion-disc assembly from said transfer dial, and a pressure dial receiving said assemblies from said transfer dial.

33. A machine of the class described for continuously forming spot caps as a single operation comprising continuously moving means for supporting a succession of cushion shell assemblies, means for forming successively a multiplicity of spots from a continuous strip, means for controlling the feed of said strip to the spot forming apparatus to assure that a spot will be formed for each complete cushion shell assembly, means for successively feeding a multiplicity of spot discs to said assemblies while moving with said first-mentioned means, means for applying a spot to each cushion, and means for removing the cushion shell disc assemblies from the machine.

34. A machine of the class described for continuously forming spot caps as a single operation comprising continuously moving means for supporting a succession of cushion shell assemblies, means for forming successively a multiplicity of spots from a continuous strip, means for controlling the feed of said strip to the spot forming apparatus to assure that a spot will be formed for each complete cushion shell assembly, means for successively feeding a multiplicity of spot discs to said assemblies, means for applying a spot to each cushion while moving with said first-mentioned means, means for causing the cushion to unite to the shell, and means for causing the spot to unite to the cushion.

35. Apparatus for center spotting container closures comprising means for moving closure shells containing cushion discs continuously along a predetermined path, and means for successively punching from a strip of material and for adhesively uniting in central relation to the cushion discs in the shells during the continuous movement of the latter, center spot facings of substantially less diameter than the cushion discs.

36. Apparatus for center spotting container closures comprising means for moving closure shells containing cushion discs continuously along a predetermined path, and means for successively punching spots of substantially less diameter than the cushion discs from a strip of material and for adhesively uniting the same in centered relation to the cushion discs in the shells during the continuous movement of the latter, said last-mentioned means including a continuously moving carrier for receiving preformed spots, said carrier having a path of movement in the course of which the spots are positioned over the shells.

37. Apparatus for center spotting container closures comprising means for moving closure shells containing cushion discs continuously along a predetermined path, means for successively punching spots of substantially less diameter than the cushion discs from a strip of material and for adhesively uniting the same to the cushion discs in the shells during the continuous movement of the latter, said last-mentioned means including a continuously moving carrier for receiving preformed spots, said carrier having a path of movement in the course of which the spots are positioned over the shells, and means for removing the spots successively from the spot carrier in the course of its continuous movement and depositing them centrally upon the cushion discs.

38. Apparatus for center spotting container closures comprising means for moving closure shells containing cushion discs continuously along a predetermined path, means for successively punching spots of substantially less diameter than the cushion discs from a strip of material and for adhesively uniting the same centrally to the cushion discs in the shells during the continuous movement of the latter, and means for receiving the spotted closures from said first mentioned means and maintaining the same under pressure.

39. Apparatus for center spotting container closures comprising means for moving closure shells containing cushion discs continuously along a predetermined path, means for successively punching spots of substantially less diameter than the cushion discs from a strip of material and for adhesively uniting the same centrally to the cushion discs in the shells during the continuous movement of the latter, and continuously moving means for receiving the spotted closures from said first mentioned means and maintaining the same under pressure.

40. Apparatus for center spotting closures comprising continuously moving means for conveying closure shells containing cushion discs, means for punching spots of substantially less diameter than the cushion discs, continuously moving means for conveying the punched spots into registry with the shells on said first mentioned means, and means for removing the spots from their carrier during the course of the latter's continuous movement and successively depositing the same in centered relation upon the cushion discs.

41. Apparatus for center spotting closures comprising continuously moving means for conveying closure shells containing cushion discs, means for punching spots of substantially less diameter than the cushion discs, continuously moving means for conveying the punched spots into registry with the shells on said first mentioned means, means for removing the spots from their carrier during the course of the latter's continuous movement and successively depositing the same in centered relation upon the cushion discs, and continuously moving means for receiving the spotted discs from said first mentioned means and maintaining the spots under pressure.

42. Apparatus for center spotting closures comprising continuously moving rotating means for conveying closure shells containing cushion discs, means for punching spots of substantially less diameter than the cushion discs, continuously moving means for conveying the punched spots into registry with the shells on said first mentioned means, and means for removing the spots from their carrier during the course of the latter's continuous movement and successively depositing the same in centered relation upon the cushion discs.

43. Apparatus for center spotting closures comprising continuously moving rotating means for conveying closure shells containing cushion discs, means for punching spots of substantially less diameter than the cushion discs, continuously moving rotating means for conveying the punched spots into registry with the shells on said first mentioned means, and means for removing the spots from their carrier during the course of the latter's continuous movement and successively depositing the same in centered relation upon the cushion discs.

44. Apparatus for center spotting closures comprising continuously moving means for conveying closure shells containing cushion discs, means for punching spots of substantially less diameter than the cushion discs, continuously moving means for conveying the punched spots into registry with the shells on said first mentioned means, means for removing the spots from their carrier during the course of the latter's continuous movement and successively depositing the same in centered relation upon the cushion discs, and continuously moving rotating means for receiving the spotted discs from said first mentioned means and maintaining the spots under pressure.

45. The improved method for center spotting the cushion discs of container closures which comprises continuously moving the discs along a predetermined path, moving center spots of substantially less diameter than the cushion discs continuously along a path which overlaps said discs and during the movement of the discs and spots, without interrupting their movements, successively applying the spots to the discs in centered relation thereon.

46. The improved method of center spotting the cushion discs of container closures which comprises continuously moving the closures with the discs therein along a predetermined path, continuously moving formed center spots of substantially less diameter than the cushion discs along a predetermined path which overlaps the path of said closures and during the movements of the center spots and closures, without interrupting their movements, successively adhering the spots to the cushion discs in centered relation thereon.

47. The improved method of center spotting the cushion discs of container closures which comprises continuously moving the closures with the discs therein along a predetermined path, punching center spots of substantially less diameter than the cushion discs from adhesively coated strip material, continuously moving formed center spots along a predetermined path which overlaps the path of said closures and during the movement of the center spots and closures, without interrupting their movements, successively adhering the spots to the cushion discs in centered relation thereon.

48. The improved method for center spotting the cushion discs of container closures which comprises continuously moving the discs along a predetermined path, moving center spots of substantially less diameter than the cushion discs continuously along a path which overlaps said discs, during movement of the discs and spots, without interrupting their movements, successively applying the spots to the discs in centered relation thereon, and continuing the movement of the assembled spots and discs while maintaining the same under pressure.

49. The improved method of center spotting the cushion discs of container closures which comprises continuously moving the closures with the discs therein along a predetermined path, continuously moving formed center spots of substantially less diameter than the cushion discs along a predetermined path which overlaps the path of said closures, during the movements of the center spots and closures, without interrupting their movements, successively adhering the spots to the cushion discs in centered relation thereon and continuing the movement of the assembled spots and discs while maintaining the same under pressure.

50. Apparatus for center spotting container closures comprising means for moving closure shells containing cushion discs continuously along a predetermined path, and means for successively punching from a strip of material and for adhesively uniting in centered relation to the cushion discs in the shells during the continuous movement of the latter, center spot facings of substantially less diameter than the cushion discs, said means including a centering means adapted to center the shells during the deposition of the facings.

51. Apparatus for center spotting container closures comprising means for moving closure shells containing cushion discs continuously along a predetermined path, and means for successively punching spots of substantially less diameter than the cushion discs from a strip of material and for adhesively uniting the same to the cushion discs in the shells during the continuous movement of the latter, said last mentioned means including a continuously moving carrier for receiving preformed spots, said carrier having a path of movement in the course of which the spots are positioned over the shells, and means for centering the spots in the shells as they are being applied.

52. The improved method of facing cushion discs of closures with center spots of less diameter than the cushion discs, which consists in successively punching center spots from a strip of material coated with a thermoplastic adhesive and depositing the same on a carrier in the punching operation, moving the formed spots along a predetermined path, in the course of said path directly heating the spots on the carrier, thereafter bringing cushion discs into coaxial alignment with the pre-heated spots and successively pressing the spots directly from the carrier onto the cushion discs in centered relation thereto.

53. The improved method of facing cushion discs of closures with center spots of less diameter than the cushion discs, which consists in successively punching center spots from a strip of material and depositing the same on a carrier in the punching operation, moving the formed spots along a predetermined path over a series of continuously moving cushion discs and successively moving the spots directly from the carrier onto the cushion discs in centered relation thereto as the spots are moved thereover.

54. The improved method of spotting cushion discs of closures with facings of less diameter than the cushion discs which consists in successively punching spots from a strip of material, continuously moving the formed spots along a predetermined path, continuously moving a series of cushion discs beneath the spots, and successively uniting the spots to the cushion discs in central position thereon while the spots and discs are moving.

55. A machine of the class described for forming spot caps by a continuous operation comprising means for feeding a succession of metal shells, means for inserting a cushion liner in each shell, means for continuously moving said cushion and shell, means for feeding a spot disc of less diameter than the cushion liner and applying the same in centered relation upon the cushion in each shell while the latter is being moved by said means, and means for controlling the operation of all of said means during travel of the shells through the machine.

56. A machine of the class described for forming spot caps by a continuous operation comprising means for feeding a succession of metal shells, means for inserting a cushion liner in each shell, means for continuously moving said cushion and shell, means for feeding a spot disc of less diameter than the cushion liner and applying the same in centered relation upon the cushion in each shell while the latter is being moved by said means, and mechanism for controlling the operation of all of said means in timed relation during travel of the shells through the machine.

57. A machine of the class described for forming spot caps by a continuous operation comprising means for feeding a succession of metal shells, means for inserting a cushion liner in each shell, means for continuously moving said cushion and shell, means for applying a spot disc of less diameter than the cushion liner in centered relation to each cushion, while the latter is being moved by said means, means for adhering the cushion to the shell and the spot to the cushion, and means for controlling the operation of all of said means during travel of the shells through the machine.

58. A machine of the class described for forming spot caps by a continuous operation comprising means for feeding a succession of metal shells, means for inserting a cushion liner in each shell, means for continuously forming spot discs of less diameter than the cushion liner from strip spotting material, means for preventing formation of spots when a shell without a cushion is fed through the machine, means for feeding and applying a spot in centered relation to each cushion, and mechanism for controlling the operation of all of said means during travel of the shells through the machine.

59. A machine of the class described for forming spot caps by a continuous operation comprising means for feeding a succession of metal shells, means for inserting a cushion liner in each shell, means for continuously moving said cushion and shell, means for feeding a spot disc of less diameter than the liner and applying the same in centered relation upon the liner in each shell while the latter is being moved by said means, means for causing the cushion liner to unite to the shell before the disc is applied thereto, and mechanism for controlling the operation of all of said means during travel of the shells through the machine.

60. The improved method of facing cushion discs of closures with center spots of less diameter than the cushion discs which consists in punching center spots from material coated with a thermoplastic adhesive while in a substantially non-tacky condition and depositing the spots on a carrier in the punching operation, carrying the formed spots along a predetermined path, directly applying heat to the carried spots while they are moving along said path to render the adhesive on the spots adherent, thereafter bringing closures containing cushion discs into co-axial alignment with the heated carried spots and pressing the heated spots directly onto the cushion discs in centered relation thereto while the spots are on the carrier.

61. The improved method of center spotting the cushion discs of caps with spots of substantially less diameter than the cushion discs which comprises punching a center spot from material coated with heat-fusible adhesive while the adhesive is unsoftened, applying the spot to a carrier in the punching operation, directly heating the spot while the latter is supported by said carrier, bringing a cushion disc into co-axial alignment with the spot while the latter is on the carrier, and while the spot is being moved by the carrier depositing the heated spot onto the cushion disc and maintaining the same under pressure on the disc without interrupting movement of the carrier.

62. The improved method of center spotting the cushion discs of caps with spots of substantially less diameter than the cushion discs which comprises punching a center spot from material coated with heat-fusible adhesive while the adhesive is unsoftened, applying the spot to a carrier in the punching operation, carrying the spot through a predetermined path, directly heating the spot while moving through said path to fuse the adhesive while the spot is on the carrier, thereafter bringing a cushion disc a substantially greater diameter than the spot into coaxial alignment with the pre-heated spot, and pressing the heated spot onto the cushion disc.

63. The improved method of center spotting cushion discs of caps with spots of substantially less diameter than the cushion discs which comprises punching center spots from material coated with a heat-fusible adhesive while the adhesive is unheated and relatively non-adherent, receiving and individually supporting the spots as they are punched and conveying the same along a predetermined path, heating the spots while moving them through said path, thereafter bringing into co-axial alignment with said spots at a portion of the said path closures having cushion discs of substantially larger diameter than the spots, and pressing the heated and individually supported spots centrally upon the cushion discs while the discs and spots are in co-axial alignment.

64. The improved method of center spotting cushion discs of caps which comprises punching center spots from material coated with a heat-fusible adhesive while the adhesive is unheated and relatively non-adherent, receiving and individually supporting the spots as they are punched, conveying the spots along a predetermined path, heating the spots while moving them through said path, thereafter bringing into co-axial alignment with said spots at a portion of the said path closures having cushion discs of substantially larger diameter than the spots, and pressing the heated and individually supported spots centrally upon the cushion discs while the discs and spots are in co-axial alignment and while moving the discs and the spots.

65. The improved method of facing cushion discs of closures with center spots of less diameter than the cushion discs which comprises punching center spots from material coated with a thermoplastic adhesive and depositing the spots on a supporting carrier as they are punched, directly heating the spots on the carrier, thereafter bringing cushion discs into co-axial alignment with the spots on the carrier, and then moving the heated spots relative to the cushion discs to apply the spots to the discs in centered adherent relation.

66. The improved method of facing cushion discs of closures with center spots of less diameter than the cushion discs which comprises punching center spots from material coated with a thermoplastic adhesive and depositing the same on a supporting carrier as they are punched, heating the spots on the carrier, supplying cushion discs into co-axial alignment with the spots on the carrier and then as the spots are being conveyed by the carrier pressing the heated spots and the cushion discs relative to one another and laterally of the line of the path of conveyance of the spots by the carrier to apply the spots to the discs in centered adherent relation, whereby to adhere the spots to the cushion discs without interrupting movement of the carrier.

67. The improved method of facing cushion discs of closures with center spots of less diameter than the cushion discs which comprises punching center spots from a strip of material coated with a thermoplastic adhesive and depositing the spots on a supporting carrier as they are punched, heating the spots on the carrier while moving the latter to convey the spots, thereafter bringing cushion discs into co-axial alignment with the previously heated spots without interrupting movement of the spots with the carrier, and then as the spots are moved by the carrier pressing the heated spots laterally with respect to the path of movement of the carrier and against the cushion discs to apply the spots to the discs in centered adherent relation, whereby to adhere the spot to the cushion disc without interrupting movement of the carrier.

68. Apparatus for center spotting the cushion discs of container closures with spots of less diameter than the discs comprising means for punching center spots from a strip of adhesively coated material, means for receiving the punched spots and for conveying the same along a predetermined path, means for directly heating the spots while the latter are on the carrier, means for supplying closure shells containing cushion discs of substantially larger diameter than the center spots and for moving the discs with the spots co-axially aligned with the discs, and means for pressing the pre-heated spots against the cushion discs during the movement of the spots and discs, whereby the spots are united to the discs while the spots are conveyed along said path.

69. Apparatus for center spotting the cushion discs of container closures with spots of less diameter than the discs comprising means for punching spots from adhesively coated material, a rotary carrier having means for individually receiving the spots as they are punched and for supporting the same as they are moved by the carrier along a predetermined path, means for heating the spots on said carrier as the latter moves the spot through said path, means for supplying closure shells containing cushion discs into co-axial alignment with the heated spots on the carrier, and means for pressing together the pre-heated spots onto the registered discs.

70. Apparatus for center spotting the cushion discs of container closures with spots of less diameter than the discs comprising means for punching spots from adhesively coated material, a rotary carrier having means for individually receiving the spots as they are punched and for supporting the same as they are progressed by the carrier along a predetermined path, means for directly heating the spots on said carrier, means for supplying closure shells containing cushion discs into co-axial alignment with the heated spots on the carrier, and means for pressing the heated spots onto the aligned discs in the course of said path.

71. Apparatus for center spotting the cushion discs of container closures with spots of less diameter than the discs comprising means for punching spots from material coated with a thermoplastic adhesive, a rotary carrier having means for individually supporting the same as they are progressed by the carrier along a predetermined path, means for directly heating the spots on said carrier, means for supplying closure shells containing cushion discs into co-axial alignment with the heated spots on the carrier, and means operative while the carrier is supporting the spots to press the spots in a direction laterally in respect to their previous movement and to adhere the spots to the aligned discs.

72. Apparatus for center spotting closures comprising means for supporting and conveying closure shells containing cushion discs, means for punching from a material coated with thermoplastic adhesive spots of substantially less diameter than the cushion discs, means for receiving and individually supporting the spots as they are formed in the punching operation and for conveying the same along a predetermined path, said spot receiving and supporting means comprising a rotary carrier including individual spot receiving and carrying elements, heating means for rendering adherent the adhesive of the spots while the latter are on the carrier, means operative as said spot carrying and conveying means moves the spots for bringing the spots and cushion discs into co-axial alignment, and means for pressing the spots centrally on said cushion discs as the spots are being moved along said path.

73. Apparatus for applying to the cushion discs of caps center spots of less diameter than the discs comprising a rotary carrier, means on said carrier for receiving and supporting individually a multiplicity of center spots, means for punching spots from adhesively coated material and causing the spots to be individually positioned on said receiving means in the punching operation, means for directly heating the spots while on said carrier, means for subsequently aligning co-axially cushion discs and the pre-heated spots, and means for pressing the carrier-supported heated spots onto the cushion disc.

74. In a pad and protective disc assembling machine, a disc carrier, means for punching and depositing in the punching operation a fusible adhesive coated disc on said carrier, means for directly heating the disc while on said carrier, means for presenting a pad and said supported disc in centered relation, and means for pressing together the carried disc and a pad to cause the disc to be adhesively united to the pad.

75. The method of assembling cap pads and protective discs which comprises supporting a fusible adhesive coated disc by a carrier element in a disc punching operation, conveying the disc by said element, directly heating the disc on said element, and bringing about relative movement between the disc and a pad for applying the disc to the pad directly from said element.

76. In closure cap spot forming and assembling apparatus, the combination of a die, a punch movable through the die, a spot carrier having individual spot supporting elements adapted to be brought into registry with said die to directly receive a spot formed by the punch, means for moving the carrier to impart a movement of translation to the spot, means for heating each spot while on its carrier element and in the course of its movement of translation and means for moving each carrier element in a direction laterally of its movement of translation and toward a pad and for pressing the spot against the pad in the course of said movement of translation.

77. In a pad and protective disc assembling machine, a disc carrier, means for supporting a fusible adhesive coated disc by said carrier, means for directly heating the disc while on said carrier, means for presenting a pad and said supported disc in centered relation, and means for pressing together the carried disc and a pad to cause the disc to be adhesively united to the pad.

JOHN D. ELDER.